US00RE48317E

(19) United States
(12) Reissued Patent
Gall et al.

(10) Patent Number: US RE48,317 E
(45) Date of Reissued Patent: Nov. 17, 2020

(54) INTERRUPTED PARTICLE SOURCE

(71) Applicant: Mevion Medical Systems, Inc., Littleton, MA (US)

(72) Inventors: Kenneth P. Gall, Somerville, MA (US); Gerrit Townsend Zwart, Durham, NH (US)

(73) Assignee: Mevion Medical Systems, Inc., Littleton, MA (US)

(21) Appl. No.: 15/446,633

(22) Filed: Mar. 1, 2017

Related U.S. Patent Documents

Reissue of:
(64) Patent No.: 8,970,137
Issued: Mar. 3, 2015
Appl. No.: 14/075,261
Filed: Nov. 8, 2013

U.S. Applications:
(63) Continuation of application No. 11/948,662, filed on Nov. 30, 2007, now Pat. No. 8,581,523.

(51) Int. Cl.
*H05H 7/00* (2006.01)
*H05H 13/02* (2006.01)

(52) U.S. Cl.
CPC ..... *H05H 13/02* (2013.01)

(58) Field of Classification Search
CPC ..... H05H 13/02
USPC ..... 315/501, 502, 503
See application file for complete search history.

(56) References Cited

U.S. PATENT DOCUMENTS 2,280,606 A 4/1942 Roberts
2,492,324 A 12/1949 Salisbury
2,615,129 A 10/1952 Mcmillan ..... H05H 13/02 313/62
2,659,000 A 11/1953 Salisbury
3,175,131 A 3/1965 Burleigh et al.
3,432,721 A 3/1969 Naydan et al.
3,582,650 A 6/1971 Avery
3,679,899 A 7/1972 Dimeff
3,689,847 A 9/1972 Verster
3,757,118 A 9/1973 Hodge et al.
3,868,522 A 2/1975 Bigham et al.
(Continued)

FOREIGN PATENT DOCUMENTS

CA 2629333 5/2007
CN 1537657 A 10/2004
(Continued)

OTHER PUBLICATIONS

Angert, N (GSI, Darmstadt), CAS—CERN Accelerator School : 5th General Accelerator Physics Course, Jyväskylä, Finland, Sep. 7-18, 1992, pp. 619-642 (CERN-1994-001).
(Continued)

*Primary Examiner* — Angela M Lie
(74) *Attorney, Agent, or Firm* — Burns & Levinson, LLP.

(57) ABSTRACT

A synchrocyclotron includes magnetic structures to provide a magnetic field to a cavity, a particle source to provide a plasma column to the cavity, where the particle source has a housing to hold the plasma column, and where the housing is interrupted at an acceleration region to expose the plasma column, and a voltage source to provide a radio frequency (RF) voltage to the cavity to accelerate particles from the plasma column at the acceleration region.

62 Claims, 9 Drawing Sheets

(56) References Cited

U.S. PATENT DOCUMENTS 3,886,367 A 5/1975 Castle, Jr.
3,925,676 A 12/1975 Bigham et al.
2,958,327 A 5/1976 Marancik et al.
3,955,089 A 5/1976 McIntyre et al.
3,958,327 A 5/1976 Marancik et al.
3,992,625 A 11/1976 Schmidt et al.
4,038,622 A 7/1977 Purcell
4,047,068 A 9/1977 Ress et al.
4,112,306 A 9/1978 Nunan
4,129,784 A 12/1978 Tschunt et al.
4,139,777 A 2/1979 Rautenbach
4,197,510 A 4/1980 Szu
4,220,866 A 9/1980 Symmons et al.
4,230,129 A 10/1980 LeVeen
4,256,966 A 3/1981 Heinz
4,293,772 A 10/1981 Stieber
4,336,505 A 6/1982 Meyer
4,342,060 A 7/1982 Gibson
4,345,210 A 8/1982 Tran
4,353,033 A 10/1982 Karasawa
4,425,506 A 1/1984 Brown et al.
4,490,616 A 12/1984 Cipollina et al.
4,507,614 A 3/1985 Prono et al.
4,507,616 A 3/1985 Blosser et al.
4,589,126 A 5/1986 Augustsson et al.
4,598,208 A 7/1986 Brunelli et al.
4,628,523 A 12/1986 Heflin
4,633,125 A 12/1986 Blosser et al.
4,641,057 A 2/1987 Blosser et al.
4,641,104 A 2/1987 Blosser et al.
4,651,007 A 3/1987 Perusek et al.
4,680,565 A 7/1987 Jahnke
4,705,955 A 11/1987 Mileikowsky
4,710,722 A 12/1987 Jahnke
4,726,046 A 2/1988 Nunan
4,727,293 A * 2/1988 Asmussen ..... H01J 27/16
118/723 MA
4,734,653 A 3/1988 Jahnke
4,736,173 A 4/1988 Basil, Jr. et al.
4,737,727 A 4/1988 Yamada et al.
4,739,173 A 4/1988 Blosser et al.
4,745,367 A 5/1988 Dustmann et al.
4,754,147 A 6/1988 Maughan et al.
4,763,483 A 8/1988 Olsen
4,767,930 A 8/1988 Stieber et al.
4,769,623 A 9/1988 Marsing et al.
4,771,208 A 9/1988 Jongen et al.
4,783,634 A 11/1988 Yamamoto et al.
4,808,941 A 2/1989 Marsing
4,812,658 A 3/1989 Koehler
4,843,333 A 6/1989 Marsing et al.
4,845,371 A 7/1989 Stieber
4,865,284 A 9/1989 Gosis et al.
4,868,843 A 9/1989 Nunan
4,868,844 A 9/1989 Nunan
4,870,287 A 9/1989 Cole et al.
4,880,985 A 11/1989 Jones
4,894,541 A 1/1990 Ono
4,902,993 A 2/1990 Krevet
4,904,949 A 2/1990 Wilson
4,905,267 A 2/1990 Miller et al.
4,917,344 A 4/1990 Prechter et al.
4,931,698 A 6/1990 Yoshida
4,943,781 A 7/1990 Wilson et al.
4,945,478 A 7/1990 Merickel et al.
4,968,915 A 11/1990 Wilson et al.
4,987,309 A 1/1991 Klasen et al.
4,996,496 A 2/1991 Kitamura et al.
5,006,759 A 4/1991 Krispel
5,010,562 A 4/1991 Hernandez et al.
5,012,111 A 4/1991 Ueda
5,017,789 A 5/1991 Young et al.
5,017,882 A 5/1991 Finlan
5,036,290 A 7/1991 Sonobe et al.
5,039,057 A 8/1991 Prechter et al.
5,039,867 A 8/1991 Nishihara et al.
5,046,078 A 9/1991 Hernandez et al.
5,072,123 A 12/1991 Johnsen
5,111,042 A 5/1992 Sullivan et al.
5,111,173 A 5/1992 Matsuda et al.
5,117,194 A 5/1992 Nakanishi et al.
5,117,212 A 5/1992 Yamamoto et al.
5,117,829 A 6/1992 Miller et al.
5,148,032 A 9/1992 Hernandez
5,166,531 A 11/1992 Huntzinger
5,189,687 A 2/1993 Bova et al.
5,240,218 A 8/1993 Dye
5,260,579 A 11/1993 Yasuda et al.
5,260,581 A 11/1993 Lesyna et al.
5,278,533 A 1/1994 Kawaguchi
5,285,166 A 2/1994 Hiramoto et al.
5,317,164 A 5/1994 Kurokawa
5,336,891 A 8/1994 Crewe
5,341,104 A 8/1994 Anton et al.
5,349,198 A 9/1994 Takanaka
5,365,742 A 11/1994 Boffito et al.
5,374,913 A 12/1994 Pissantezky et al.
5,382,914 A 1/1995 Hamm et al.
5,401,973 A 3/1995 McKeown et al.
5,405,235 A 4/1995 Lebre et al.
5,434,420 A 7/1995 McKeown et al.
5,440,133 A 8/1995 Moyers et al.
5,451,794 A 9/1995 McKeown et al.
5,461,773 A 10/1995 Kawaguchi
5,463,291 A 10/1995 Carroll et al.
5,464,411 A 11/1995 Schulte et al.
5,492,922 A 2/1996 Palkowitz
5,511,549 A 4/1996 Legg et al.
5,521,469 A 5/1996 Laisne
5,538,942 A 7/1996 Koyama et al.
5,549,616 A 8/1996 Schulte et al.
5,561,697 A 10/1996 Takafuji et al.
5,585,642 A 12/1996 Britton et al.
5,633,747 A 5/1997 Nikoonahad
5,635,721 A 6/1997 Bardi et al.
5,668,371 A 9/1997 Deasy et al.
5,672,878 A 9/1997 Yao
5,691,679 A 11/1997 Ackermann et al.
5,726,448 A 3/1998 Smith et al.
5,727,554 A 3/1998 Kalend et al.
5,730,745 A 3/1998 Schulte et al.
5,751,781 A 5/1998 Brown et al.
5,778,047 A 7/1998 Mansfield et al.
5,783,914 A 7/1998 Hiramoto et al.
5,784,431 A 7/1998 Kalend et al.
5,797,924 A 8/1998 Schulte et al.
5,811,944 A 9/1998 Sampayan et al.
5,818,058 A 10/1998 Nakanishi et al.
5,821,705 A 10/1998 Caporaso et al.
5,825,845 A 10/1998 Blair et al.
5,841,237 A 11/1998 Alton
5,846,043 A 12/1998 Spath
5,851,182 A 12/1998 Sahadevan
5,866,912 A 2/1999 Slater et al.
5,874,811 A 2/1999 Finlan et al.
5,895,926 A 4/1999 Britton et al.
5,920,601 A 7/1999 Nigg et al.
5,929,458 A 7/1999 Nemezawa et al.
5,963,615 A 10/1999 Egley et al.
5,993,373 A 11/1999 Nonaka et al.
6,008,499 A 12/1999 Hiramoto et al.
6,034,377 A 3/2000 Pu
6,057,655 A 5/2000 Jongen
6,061,426 A 5/2000 Linders et al.
6,064,807 A 5/2000 Arai et al.
6,066,851 A 5/2000 Madono et al.
6,080,992 A 6/2000 Nonaka et al.
6,087,670 A 7/2000 Hiramoto et al.
6,094,760 A 8/2000 Nonaka et al.
6,118,848 A 9/2000 Reiffel
6,140,021 A 10/2000 Nakasuji et al.
6,144,875 A 11/2000 Schweikard et al.
6,158,708 A 12/2000 Egley et al.
6,207,952 B1 3/2001 Kan et al.

(56) References Cited

U.S. PATENT DOCUMENTS 6,219,403 B1 4/2001 Nishihara
6,222,905 B1 4/2001 Yoda et al.
6,241,671 B1 6/2001 Ritter et al.
6,246,066 B1 6/2001 Yuehu
6,256,591 B1 7/2001 Yoda et al.
6,265,837 B1 7/2001 Akiyama et al.
6,268,610 B1 7/2001 Pu
6,278,239 B1 8/2001 Caporaso et al.
6,279,579 B1 8/2001 Riaziat et al.
6,307,914 B1 10/2001 Kunieda et al.
6,316,776 B1 11/2001 Hiramoto et al.
6,366,021 B1 4/2002 Meddaugh et al.
6,368,678 B1 * 4/2002 Bluck ..... C23C 16/26 118/723 E
6,369,585 B2 4/2002 Yao
6,380,545 B1 4/2002 Yan
6,407,505 B1 6/2002 Bertsche
6,417,634 B1 7/2002 Bergstrom
6,433,336 B1 8/2002 Jongen et al.
6,433,349 B2 8/2002 Akiyama et al.
6,433,494 B1 8/2002 Kulish et al.
6,441,569 B1 8/2002 Janzow
6,443,349 B1 9/2002 Van Der Burg
6,465,957 B1 10/2002 Whitham et al.
6,472,834 B2 10/2002 Hiramoto et al.
6,476,403 B1 11/2002 Dolinskii et al.
6,492,922 B1 12/2002 New
6,493,424 B2 12/2002 Whitham
6,498,444 B1 12/2002 Hanna et al.
6,501,981 B1 12/2002 Schweikard et al.
6,519,316 B1 2/2003 Collins
6,593,696 B2 7/2003 Ding et al.
6,594,336 B2 7/2003 Nishizawa et al.
6,600,164 B1 7/2003 Badura et al.
6,617,598 B1 9/2003 Matsuda
6,621,889 B1 9/2003 Mostafavi
6,627,875 B2 * 9/2003 Afeyan ..... G01N 30/72 250/282
6,639,234 B1 10/2003 Badura et al.
6,646,383 B2 11/2003 Bertsche et al.
6,670,618 B1 12/2003 Hartmann et al.
6,683,318 B1 1/2004 Haberer et al.
6,683,426 B1 1/2004 Kleeven
6,693,283 B2 2/2004 Eickhoff et al.
6,710,362 B2 3/2004 Kraft et al.
6,713,773 B1 3/2004 Lyons et al.
6,713,976 B1 3/2004 Zumoto et al.
6,717,162 B1 4/2004 Jongen
6,736,831 B1 5/2004 Hartmann et al.
6,745,072 B1 6/2004 Badura et al.
6,769,806 B2 8/2004 Moyers
6,774,383 B2 8/2004 Norimine et al.
6,777,689 B2 8/2004 Nelson
6,777,700 B2 8/2004 Yanagisawa et al.
6,780,149 B1 8/2004 Schulte
6,799,068 B1 9/2004 Hartmann et al.
6,800,866 B2 10/2004 Amemiya et al.
6,803,585 B2 10/2004 Glukhoy et al.
6,803,591 B2 10/2004 Muramatsu et al.
6,814,694 B1 11/2004 Pedroni
6,822,244 B2 11/2004 Beloussov et al.
6,853,142 B2 2/2005 Chistyakov
6,853,703 B2 2/2005 Svatos et al.
6,864,770 B2 3/2005 Nemoto et al.
6,865,254 B2 3/2005 Nafstadius
6,873,123 B2 3/2005 Marchand et al.
6,891,177 B1 5/2005 Kraft et al.
6,891,924 B1 5/2005 Yoda et al.
6,894,300 B2 5/2005 Reimoser et al.
6,897,451 B2 5/2005 Kaercher et al.
6,914,396 B1 7/2005 Symons et al.
6,936,832 B2 8/2005 Norimine et al.
6,953,943 B2 10/2005 Yanagisawa et al.
6,965,116 B1 11/2005 Wagner et al.
6,969,194 B1 11/2005 Nafstadius
6,979,832 B2 12/2005 Yanagisawa et al.
6,984,835 B2 1/2006 Harada
6,992,312 B2 1/2006 Yanagisawa et al.
6,993,112 B2 1/2006 Hesse
7,008,105 B2 3/2006 Amann et al.
7,011,447 B2 3/2006 Moyers
7,012,267 B2 3/2006 Moriyama et al.
7,014,361 B1 3/2006 Ein-Gal
7,026,636 B2 4/2006 Yanagisawa et al.
7,041,479 B2 5/2006 Swartz et al.
7,045,781 B2 5/2006 Adamec et al.
7,049,613 B2 5/2006 Yanagisawa et al.
7,053,389 B2 5/2006 Yanagisawa et al.
7,054,801 B2 5/2006 Sakamoto et al.
7,060,997 B2 6/2006 Norimine et al.
7,071,479 B2 7/2006 Yanagisawa et al.
7,073,508 B2 7/2006 Moyers
7,081,619 B2 7/2006 Bashkirov et al.
7,084,410 B2 8/2006 Beloussov et al.
7,091,478 B2 8/2006 Haberer
7,102,144 B2 9/2006 Matsuda et al.
7,122,811 B2 10/2006 Matsuda et al.
7,122,966 B2 10/2006 Norling et al.
7,122,978 B2 10/2006 Nakanishi et al.
7,135,678 B2 11/2006 Wang et al.
7,138,771 B2 11/2006 Bechthold et al.
7,154,107 B2 12/2006 Yanagisawa et al.
7,154,108 B2 12/2006 Tadokoro et al.
7,154,991 B2 12/2006 Earnst et al.
7,162,005 B2 1/2007 Bjorkholm
7,173,264 B2 2/2007 Moriyama et al.
7,173,265 B2 2/2007 Miller et al.
7,173,385 B2 2/2007 Caporaso et al.
7,186,991 B2 3/2007 Kato et al.
7,193,227 B2 3/2007 Hiramoto et al.
7,199,382 B2 4/2007 Rigney et al.
7,208,748 B2 4/2007 Sliski et al.
7,212,608 B2 5/2007 Nagamine et al.
7,212,609 B2 5/2007 Nagamine et al.
7,221,733 B1 5/2007 Takai et al.
7,227,161 B2 6/2007 Matsuda et al.
7,247,869 B2 7/2007 Tadokoro et al.
7,257,191 B2 8/2007 Sommer
7,259,529 B2 8/2007 Tanaka
7,262,424 B2 8/2007 Moriyama et al.
7,274,018 B2 9/2007 Adamec et al.
7,280,633 B2 10/2007 Cheng et al.
7,295,649 B2 11/2007 Johnsen
7,297,967 B2 11/2007 Yanagisawa et al.
7,301,162 B2 11/2007 Matsuda et al.
7,307,264 B2 12/2007 Brusasco et al.
7,318,805 B2 1/2008 Schweikard et al.
7,319,231 B2 1/2008 Moriyama et al.
7,319,336 B2 1/2008 Baur et al.
7,331,713 B2 2/2008 Moyers
7,332,880 B2 2/2008 Ina et al.
7,345,291 B2 3/2008 Kats
7,345,292 B2 3/2008 Moriyama et al.
7,348,557 B2 3/2008 Armit
7,348,579 B2 3/2008 Pedroni
7,351,988 B2 4/2008 Naumann et al.
7,355,189 B2 4/2008 Yanagisawa et al.
7,361,607 B2 * 4/2008 Yamaguchi ..... H01L 21/02057 216/58
7,368,740 B2 5/2008 Beloussov et al.
7,372,053 B2 5/2008 Yamashita et al.
7,378,672 B2 5/2008 Harada
7,381,979 B2 6/2008 Yamashita et al.
7,397,054 B2 7/2008 Natori et al.
7,397,901 B1 7/2008 Johnsen
7,398,309 B2 7/2008 Baumann et al.
7,402,822 B2 7/2008 Guertin et al.
7,402,823 B2 7/2008 Guertin et al.
7,402,824 B2 7/2008 Guertin et al.
7,402,963 B2 7/2008 Sliski
7,405,407 B2 7/2008 Hiramoto et al.
7,425,717 B2 9/2008 Matsuda et al.
7,432,516 B2 10/2008 Peggs et al.
7,439,528 B2 10/2008 Nishiuchi et al.

(56) References Cited

U.S. PATENT DOCUMENTS 7,446,328 B2 11/2008 Rigney et al.
7,446,490 B2 11/2008 Jongen et al.
7,449,701 B2 11/2008 Fujimaki et al.
7,453,076 B2 11/2008 Welch et al.
7,465,944 B2 12/2008 Ueno et al.
7,466,085 B2 12/2008 Nutt
7,468,506 B2 12/2008 Rogers et al.
7,473,913 B2 1/2009 Hermann et al.
7,476,867 B2 1/2009 Fritsch et al.
7,476,883 B2 1/2009 Nutt
7,482,606 B2 1/2009 Groezinger et al.
7,492,556 B2 2/2009 Atkins et al.
7,507,975 B2 3/2009 Mohr
7,525,104 B2 4/2009 Harada
7,541,905 B2 6/2009 Antaya
7,547,901 B2 6/2009 Guertin et al.
7,554,096 B2 6/2009 Ward et al.
7,554,097 B2 6/2009 Ward et al.
7,555,103 B2 6/2009 Johnsen
7,557,358 B2 7/2009 Ward et al.
7,557,359 B2 7/2009 Ward et al.
7,557,360 B2 7/2009 Ward et al.
7,557,361 B2 7/2009 Ward et al.
7,560,715 B2 7/2009 Pedroni
7,560,717 B2 7/2009 Matsuda et al.
7,567,694 B2 7/2009 Lu et al.
7,574,251 B2 8/2009 Lu et al.
7,576,499 B2 8/2009 Caporaso et al.
7,579,603 B2 8/2009 Birgy et al.
7,579,610 B2 8/2009 Grozinger et al.
7,582,866 B2 9/2009 Furuhashi et al.
7,582,885 B2 9/2009 Katagiri et al.
7,582,886 B2 9/2009 Trbojevic
7,586,112 B2 9/2009 Chiba et al.
7,598,497 B2 10/2009 Yamamoto et al.
7,609,009 B2 10/2009 Tanaka et al.
7,609,809 B2 10/2009 Kapatoes et al.
7,609,811 B1 10/2009 Siljamaki et al.
7,615,942 B2 11/2009 Sanders et al.
7,626,347 B2 12/2009 Sliski
7,629,598 B2 12/2009 Harada
7,639,853 B2 12/2009 Olivera et al.
7,639,854 B2 12/2009 Schnarr et al.
7,643,661 B2 1/2010 Ruchala et al.
7,656,258 B1 2/2010 Antaya et al. ..... H01F 6/00 313/62
7,659,521 B2 2/2010 Pedroni
7,659,528 B2 2/2010 Uematsu
7,668,291 B2 2/2010 Nord et al.
7,672,429 B2 3/2010 Urano et al.
7,679,073 B2 3/2010 Urano et al.
7,682,078 B2 3/2010 Rietzel
7,692,166 B2 4/2010 Muraki et al.
7,692,168 B2 4/2010 Moriyama et al.
7,696,499 B2 4/2010 Miller et al.
7,696,847 B2 4/2010 Antaya
7,701,677 B2 4/2010 Schultz et al.
7,709,818 B2 5/2010 Matsuda et al.
7,710,051 B2 5/2010 Caporaso et al.
7,718,982 B2 5/2010 Sliski
7,728,311 B2 6/2010 Gall
7,746,978 B2 6/2010 Cheng et al.
7,755,305 B2 7/2010 Umezawa et al.
7,759,642 B2 7/2010 Nir
7,763,867 B2 7/2010 Birgy et al.
7,767,988 B2 8/2010 Kaiser et al.
7,770,231 B2 8/2010 Prater et al.
7,772,577 B2 8/2010 Saito et al.
7,773,723 B2 8/2010 Nord et al.
7,773,788 B2 8/2010 Lu et al.
7,778,488 B2 8/2010 Nord et al.
7,783,010 B2 8/2010 Clayton
7,784,127 B2 8/2010 Kuro et al.
7,786,442 B2 * 8/2010 Norling ..... H05H 13/00 250/363.03
7,786,451 B2 8/2010 Ward et al.
7,786,452 B2 8/2010 Ward et al.
7,789,560 B2 9/2010 Moyers
7,791,051 B2 9/2010 Beloussov et al.
7,796,731 B2 9/2010 Nord et al.
7,801,269 B2 9/2010 Cravens et al.
7,801,270 B2 9/2010 Nord et al.
7,801,988 B2 9/2010 Baumann et al.
7,807,982 B2 10/2010 Nishiuchi et al.
7,809,107 B2 10/2010 Nord et al.
7,812,319 B2 10/2010 Diehl et al.
7,812,326 B2 10/2010 Grozinger et al.
7,816,657 B2 10/2010 Hansmann et al.
7,817,778 B2 10/2010 Nord et al.
7,817,836 B2 10/2010 Chao et al.
7,834,334 B2 11/2010 Grozinger et al.
7,834,336 B2 11/2010 Boeh et al.
7,835,494 B2 11/2010 Nord et al.
7,835,502 B2 11/2010 Spence et al.
7,839,972 B2 11/2010 Ruchala et al.
7,839,973 B2 11/2010 Nord et al.
7,848,488 B2 12/2010 Mansfield
7,857,756 B2 12/2010 Warren et al.
7,860,216 B2 12/2010 Jongen et al.
7,860,550 B2 12/2010 Saracen et al.
7,868,301 B2 1/2011 Diehl
7,875,861 B2 1/2011 Huttenberger et al.
7,875,868 B2 1/2011 Moriyama et al.
7,881,431 B2 2/2011 Aoi et al.
7,894,574 B1 2/2011 Nord et al.
7,906,769 B2 3/2011 Blasche et al.
7,914,734 B2 3/2011 Livingston
7,919,765 B2 4/2011 Timmer
7,920,040 B2 4/2011 Antaya et al.
7,920,675 B2 4/2011 Lomax et al.
7,928,415 B2 4/2011 Bert et al.
7,934,869 B2 5/2011 Ivanov et al.
7,940,881 B2 5/2011 Jongen et al.
7,943,913 B2 5/2011 Balakin
7,947,969 B2 5/2011 Pu
7,949,096 B2 5/2011 Cheng et al.
7,950,587 B2 5/2011 Henson et al.
7,960,710 B2 6/2011 Kruip et al.
7,961,844 B2 6/2011 Takeda et al.
7,977,648 B2 7/2011 Westerly et al.
7,977,656 B2 7/2011 Fujimaki et al.
7,982,198 B2 7/2011 Nishiuchi et al.
7,982,416 B2 7/2011 Tanaka et al.
7,984,715 B2 7/2011 Moyers
7,986,768 B2 7/2011 Nord et al.
7,987,053 B2 7/2011 Schaffner
7,989,785 B2 8/2011 Emhofer et al.
7,990,524 B2 8/2011 Jureller et al.
7,997,553 B2 8/2011 Sloan et al.
8,002,466 B2 8/2011 Von Neubeck et al.
8,003,964 B2 8/2011 Stark et al.
8,009,803 B2 8/2011 Nord et al.
8,009,804 B2 8/2011 Siljamaki et al.
8,039,822 B2 10/2011 Rietzel
8,041,006 B2 10/2011 Boyden et al.
8,044,364 B2 10/2011 Yamamoto
8,049,187 B2 11/2011 Tachikawa
8,053,508 B2 11/2011 Korkut et al.
8,053,739 B2 11/2011 Rietzel
8,053,745 B2 11/2011 Moore
8,053,746 B2 11/2011 Timmer et al.
8,067,748 B2 11/2011 Balakin
8,069,675 B2 12/2011 Radovinsky et al.
8,071,966 B2 12/2011 Kaiser et al.
8,080,801 B2 12/2011 Safai
8,085,899 B2 12/2011 Nord et al.
8,089,054 B2 1/2012 Balakin
8,093,564 B2 1/2012 Balakin
8,093,568 B2 1/2012 Mackie et al.
8,111,125 B2 2/2012 Antaya et al.
8,129,699 B2 3/2012 Balakin
8,144,832 B2 3/2012 Balakin
8,173,981 B2 5/2012 Trbojevic
8,188,688 B2 5/2012 Balakin

(56) References Cited

U.S. PATENT DOCUMENTS

| | | | |
|---|---|---|---|
| 8,198,607 | B2 | 6/2012 | Balakin |
| 8,222,613 | B2 | 7/2012 | Tajiri et al. |
| 8,227,768 | B2 | 7/2012 | Smick et al. |
| 8,232,536 | B2 | 7/2012 | Harada |
| 8,288,742 | B2 | 10/2012 | Balakin |
| 8,291,717 | B2 | 10/2012 | Radovinsky et al. |
| 8,294,127 | B2 | 10/2012 | Tachibana |
| 8,304,725 | B2 | 11/2012 | Komuro et al. |
| 8,304,750 | B2 | 11/2012 | Preikszas et al. |
| 8,309,941 | B2 | 11/2012 | Balakin |
| 8,330,132 | B2 | 12/2012 | Guertin et al. |
| 8,334,520 | B2 | 12/2012 | Otaka et al. |
| 8,335,397 | B2 | 12/2012 | Takane et al. |
| 8,344,340 | B2 | 1/2013 | Gall |
| 8,350,214 | B2 | 1/2013 | Otaki et al. |
| 8,368,038 | B2 | 2/2013 | Balakin |
| 8,368,043 | B2 | 2/2013 | Havelange et al. |
| 8,373,143 | B2 | 2/2013 | Balakin |
| 8,373,145 | B2 | 2/2013 | Balakin |
| 8,378,299 | B2 | 2/2013 | Frosien |
| 8,378,321 | B2 | 2/2013 | Balakin |
| 8,382,943 | B2 | 2/2013 | Clark |
| 8,389,949 | B2 | 3/2013 | Harada et al. |
| 8,399,866 | B2 | 3/2013 | Balakin |
| 8,405,042 | B2 | 3/2013 | Honda et al. |
| 8,405,056 | B2 | 3/2013 | Amaldi et al. |
| 8,415,643 | B2 | 4/2013 | Balakin |
| 8,416,918 | B2 | 4/2013 | Nord et al. |
| 8,421,041 | B2 | 4/2013 | Balakin |
| 8,426,833 | B2 | 4/2013 | Trbojevic |
| 8,436,323 | B2 | 5/2013 | Iseki et al. |
| 8,440,987 | B2 | 5/2013 | Stephani et al. |
| 8,445,872 | B2 | 5/2013 | Behrens et al. |
| 8,466,441 | B2 | 6/2013 | Iwata et al. |
| 8,472,583 | B2 | 6/2013 | Star-Lack et al. |
| 8,483,357 | B2 | 7/2013 | Siljamaki et al. |
| 8,487,278 | B2 | 7/2013 | Balakin |
| 8,552,406 | B2 | 10/2013 | Phaneuf et al. |
| 8,552,408 | B2 | 10/2013 | Hanawa et al. |
| 8,569,717 | B2 | 10/2013 | Balakin |
| 8,581,215 | B2 | 11/2013 | Balakin |
| 8,581,523 | B2 | 11/2013 | Gall et al. |
| 8,653,314 | B2 | 2/2014 | Pelati et al. |
| 8,653,473 | B2 | 2/2014 | Yajima |
| 8,952,634 | B2 * | 2/2015 | Sliski ..... H05H 13/02 315/502 |
| 2002/0172317 | A1 | 11/2002 | Maksimchuk et al. |
| 2003/0048080 | A1 | 3/2003 | Amemiya et al. |
| 2003/0125622 | A1 | 7/2003 | Schweikard et al. |
| 2003/0136924 | A1 | 7/2003 | Kraft et al. |
| 2003/0152197 | A1 | 8/2003 | Moyers |
| 2003/0163015 | A1 | 8/2003 | Yanagisawa et al. |
| 2003/0183779 | A1 | 10/2003 | Norimine et al. |
| 2003/0234369 | A1 | 12/2003 | Glukhoy |
| 2004/0000650 | A1 | 1/2004 | Yanagisawa et al. |
| 2004/0017888 | A1 | 1/2004 | Seppi et al. |
| 2004/0056212 | A1 | 3/2004 | Yanagisawa et al. |
| 2004/0061077 | A1 | 4/2004 | Muramatsu et al. |
| 2004/0061078 | A1 | 4/2004 | Muramatsu et al. |
| 2004/0085023 | A1 | 5/2004 | Chistyakov |
| 2004/0098445 | A1 | 5/2004 | Baumann et al. |
| 2004/0111134 | A1 | 6/2004 | Muramatsu et al. |
| 2004/0118081 | A1 | 6/2004 | Reimoser et al. |
| 2004/0149934 | A1 | 8/2004 | Yanagisawa et al. |
| 2004/0159795 | A1 | 8/2004 | Kaercher et al. |
| 2004/0173763 | A1 | 9/2004 | Moriyama et al. |
| 2004/0174958 | A1 | 9/2004 | Moriyama et al. |
| 2004/0183033 | A1 | 9/2004 | Moriyama et al. |
| 2004/0183035 | A1 | 9/2004 | Yanagisawa et al. |
| 2004/0200982 | A1 | 10/2004 | Moriyama et al. |
| 2004/0200983 | A1 | 10/2004 | Fujimaki et al. |
| 2004/0213381 | A1 | 10/2004 | Harada |
| 2004/0227104 | A1 | 11/2004 | Matsuda et al. |
| 2004/0232356 | A1 | 11/2004 | Norimine et al. |
| 2004/0240626 | A1 | 12/2004 | Moyers |
| 2005/0058245 | A1 | 3/2005 | Ein-Gal |
| 2005/0089141 | A1 | 4/2005 | Brown |
| 2005/0161618 | A1 | 7/2005 | Pedroni |
| 2005/0184686 | A1 | 8/2005 | Caporaso et al. |
| 2005/0228255 | A1 | 10/2005 | Saracen et al. |
| 2005/0234327 | A1 | 10/2005 | Saracen et al. |
| 2005/0247890 | A1 | 11/2005 | Norimine et al. |
| 2006/0017015 | A1 | 1/2006 | Sliski et al. |
| 2006/0067468 | A1 | 3/2006 | Rietzel |
| 2006/0126792 | A1 | 6/2006 | Li |
| 2006/0145088 | A1 | 7/2006 | Ma |
| 2006/0175991 | A1 | 8/2006 | Fujisawa |
| 2006/0284562 | A1 | 12/2006 | Hruby et al. |
| 2007/0001128 | A1 | 1/2007 | Sliski et al. |
| 2007/0013273 | A1 | 1/2007 | Albert et al. |
| 2007/0014654 | A1 | 1/2007 | Haverfield et al. |
| 2007/0023699 | A1 | 2/2007 | Yamashita et al. |
| 2007/0029510 | A1 | 2/2007 | Hermann et al. |
| 2007/0051904 | A1 | 3/2007 | Kaiser et al. |
| 2007/0061937 | A1 | 3/2007 | Curle |
| 2007/0092812 | A1 | 4/2007 | Caporaso et al. |
| 2007/0145916 | A1 | 6/2007 | Caporaso et al. |
| 2007/0171015 | A1 | 7/2007 | Antaya |
| 2007/0181519 | A1 | 8/2007 | Khoshnevis |
| 2007/0284548 | A1 | 12/2007 | Kaiser et al. |
| 2008/0093567 | A1 | 4/2008 | Gall |
| 2008/0218102 | A1 | 9/2008 | Sliski |
| 2009/0096179 | A1 | 4/2009 | Stark et al. |
| 2009/0140671 | A1 | 6/2009 | O'Neal, III et al. |
| 2009/0140672 | A1 | 6/2009 | Gall et al. |
| 2009/0200483 | A1 | 8/2009 | Gall et al. |
| 2010/0045213 | A1 | 2/2010 | Sliski |
| 2010/0230617 | A1 | 9/2010 | Gall |
| 2010/0308235 | A1 | 12/2010 | Sliski |
| 2011/0299919 | A1 | 12/2011 | Stark |
| 2013/0053616 | A1 | 2/2013 | Gall |
| 2013/0127375 | A1 | 5/2013 | Sliski |
| 2013/0131424 | A1 | 5/2013 | Sliski |
| 2013/0237425 | A1 | 9/2013 | Leigh et al. |
| 2014/0097920 | A1 | 4/2014 | Goldie et al. |

FOREIGN PATENT DOCUMENTS

| | | | |
|---|---|---|---|
| CN | 1816243 | A | 8/2006 |
| CN | 101932361 | | 12/2010 |
| CN | 101933405 | | 12/2010 |
| CN | 101933405 | A | 12/2010 |
| CN | 101933406 | | 12/2010 |
| CN | 101061759 | | 5/2011 |
| CN | ZL200880125918.1 | | 7/2013 |
| CN | 103347363 | A | 10/2013 |
| DE | 27 53 397 | | 6/1978 |
| DE | 31 48 100 | | 6/1983 |
| DE | 35 30 446 | | 8/1984 |
| DE | 41 01 094 | C1 | 5/1992 |
| DE | 4411171 | | 10/1995 |
| EP | 0194728 | | 9/1986 |
| EP | 0194728 | A1 | 9/1986 |
| EP | 0 277 521 | | 8/1988 |
| EP | 0 208 163 | B1 | 1/1989 |
| EP | 0 222 786 | | 7/1990 |
| EP | 0 221 987 | | 1/1991 |
| EP | 0499253 | | 8/1992 |
| EP | 0499253 | A2 | 8/1992 |
| EP | 0 306 966 | | 4/1995 |
| EP | 0 388 123 | | 5/1995 |
| EP | 0 465 597 | | 5/1997 |
| EP | 0 864 337 | | 9/1998 |
| EP | 0 776 595 | | 12/1998 |
| EP | 1 069 809 | | 1/2001 |
| EP | 1 153 398 | A1 | 4/2001 |
| EP | 1 294 445 | | 3/2003 |
| EP | 1 348 465 | | 10/2003 |
| EP | 1 358 908 | | 11/2003 |
| EP | 1 371 390 | | 12/2003 |
| EP | 1 402 923 | | 3/2004 |
| EP | 0 911 064 | | 6/2004 |
| EP | 1 430 932 | | 6/2004 |
| EP | 1 454 654 | | 9/2004 |

(56) References Cited

FOREIGN PATENT DOCUMENTS

| | | | |
|---|---|---|---|
| EP | 1 454 655 | A2 | 9/2004 |
| EP | 1 454 656 | | 9/2004 |
| EP | 1 454 657 | | 9/2004 |
| EP | 1 477 206 | | 11/2004 |
| EP | 1 605 742 | A1 | 12/2005 |
| EP | 1 738 798 | | 1/2007 |
| EP | 1826778 | | 8/2007 |
| EP | 1826778 | A2 | 8/2007 |
| EP | 1949404 | | 7/2008 |
| EP | 2183753 | | 7/2008 |
| EP | 2394498 | | 2/2010 |
| EP | 2227295 | | 9/2010 |
| EP | 2232961 | | 9/2010 |
| EP | 2232962 | | 9/2010 |
| EP | 2227295 | | 5/2011 |
| EP | 2363170 | | 9/2011 |
| EP | 2363171 | | 9/2011 |
| EP | 1672670 | | 2/2014 |
| FR | 2 560 421 | | 8/1985 |
| FR | 2911843 | | 8/2008 |
| FR | 2911843 | A1 | 8/2008 |
| GB | 957342 | | 5/1964 |
| GB | 2015821 | A | 9/1979 |
| GB | 2 361 523 | | 10/2001 |
| JP | 43-23267 | | 10/1968 |
| JP | 47-0028762 | | 8/1972 |
| JP | S47-028762 | | 8/1972 |
| JP | 48-108098 | | 12/1973 |
| JP | U48-108098 | | 12/1973 |
| JP | 61-80800 | | 4/1986 |
| JP | 61-225798 | | 10/1986 |
| JP | A61-225798 | | 10/1986 |
| JP | 62-150804 | | 7/1987 |
| JP | 62-186500 | | 8/1987 |
| JP | 63-149344 | | 6/1988 |
| JP | 63-218200 | | 9/1988 |
| JP | 63-226899 | | 9/1988 |
| JP | 1-276797 | | 11/1989 |
| JP | 4-94198 | | 3/1992 |
| JP | 04-128717 | | 4/1992 |
| JP | 04-129768 | | 4/1992 |
| JP | 04-273409 | | 9/1992 |
| JP | 04-337300 | | 11/1992 |
| JP | 05-341352 | | 12/1993 |
| JP | 06-233831 | | 8/1994 |
| JP | 06233831 | | 8/1994 |
| JP | 06233831 | A | 8/1994 |
| JP | 06-036893 | | 10/1994 |
| JP | 07-260939 | | 10/1995 |
| JP | 2007-260939 | A | 10/1995 |
| JP | 07260939 | | 10/1995 |
| JP | 08-173890 | | 7/1996 |
| JP | 08-264298 | | 10/1996 |
| JP | 09-162585 | | 6/1997 |
| JP | 10-071213 | | 3/1998 |
| JP | 11-47287 | | 2/1999 |
| JP | 11-102800 | | 4/1999 |
| JP | 11-243295 | | 9/1999 |
| JP | 2000-243309 | | 9/2000 |
| JP | 2000-294399 | | 10/2000 |
| JP | 2001-6900 | | 1/2001 |
| JP | 2001-129103 | | 5/2001 |
| JP | 2002-164686 | | 6/2002 |
| JP | 2003-504628 | | 2/2003 |
| JP | A2003-504628 | | 2/2003 |
| JP | 2004-031115 | | 1/2004 |
| JP | 2004-031115 | A | 1/2004 |
| JP | 2006-032282 | | 2/2006 |
| JP | 2009-515671 | | 4/2009 |
| JP | S48-108098 | | 3/2010 |
| JP | 2010-536130 | | 11/2010 |
| JP | 2011-505191 | | 2/2011 |
| JP | 2011-505670 | | 2/2011 |
| JP | 2011-507151 | | 3/2011 |
| JP | 5046928 | | 7/2012 |
| JP | 5607536 | | 9/2014 |
| JP | 5607536 | B2 | 10/2014 |
| SU | 300137 | | 11/1969 |
| SU | 569 635 | | 8/1977 |
| TW | 200930160 | | 7/2009 |
| TW | 200934682 | | 8/2009 |
| TW | 200939908 | | 9/2009 |
| TW | 200940120 | | 10/2009 |
| WO | WO 86/07229 | | 12/1986 |
| WO | WO90/12413 | | 10/1990 |
| WO | WO 92/03028 | | 2/1992 |
| WO | WO 93/02536 | | 2/1993 |
| WO | WO 98/17342 | | 4/1998 |
| WO | WO99/39385 | | 8/1999 |
| WO | WO 00/40064 | | 7/2000 |
| WO | WO 00/49624 | | 8/2000 |
| WO | WO 01/05199 | | 1/2001 |
| WO | WO 01/26569 | | 4/2001 |
| WO | WO 02/07817 | | 1/2002 |
| WO | WO 03/039212 | | 5/2003 |
| WO | WO 03/092812 | | 11/2003 |
| WO | WO 2004/026401 | | 4/2004 |
| WO | WO 2004/101070 | | 11/2004 |
| WO | WO 2006/012467 | | 2/2006 |
| WO | 2007/061937 | | 5/2007 |
| WO | WO2007/061937 | | 5/2007 |
| WO | WO2007/084701 | | 7/2007 |
| WO | WO2007/130164 | | 11/2007 |
| WO | WO2007/145906 | | 12/2007 |
| WO | WO-2007145906 | A2 | 12/2007 |
| WO | WO2008/030911 | | 3/2008 |
| WO | WO 2008/081480 | | 10/2008 |
| WO | WO 2009/048745 | | 4/2009 |
| WO | WO2009-070173 | | 6/2009 |
| WO | WO2009/070588 | | 6/2009 |
| WO | WO2009-070588 | | 6/2009 |
| WO | WO2009-073480 | | 6/2009 |
| WO | WO 2009/048745 | | 11/2009 |

OTHER PUBLICATIONS

First Office Action (Chinese Translation) for CN 201310240538,5, 4 pages dated May 20, 2015.

First Office Action (English Translation) for CN 201310240538.5, 6 pages dated May 20, 2015.

Second Office Action (Chinese Translation) for CN 201310240538.5, 5 pages dated Dec. 4, 2015.

Examination Report for CA 2706,952, 5 pages dated Mar. 23, 2015.

Communication pursuant to Article 71(3) EPC FOR EP 08855024.9, 35 pages dated Sep. 19, 2016.

Communication pursuant to Article 94(3) EPC for EP 08855024.9, 6 pages dated Jul. 9, 2015.

Communication pursuant to Article 94(3) EPC for EP 08855024.9, 7 pages dated Apr. 6, 2016.

U.S. Provisional application No. 60/850,565, filed on Oct. 10, 2006, including copy of application as filed, transaction history from Pair (PTO website).

U.S. Provisional application No. 60/991,454, filed on Nov. 30, 2007, including copy of application as filed, transaction history from Pair (PTO website).

Written Opinion for PCT/US2007/001628, dated Feb. 18, 2008 (11 pages).

Cosgrove et al., "Microdosimetric Studies on the Orsay Proton Synchrocyclotron at 73 and 200 MeV," Radiation Protection Dosimetry, 1997, 70(1-4):493-496.

Coupland, High-field (5 T) pulsed superconducting dipole magnet, Proceedings of the Institution of Electrical Engineers, Jul. 1974, 121(7):771-778.

Coutrakon et al. Proton Synchrotrons for Cancer Therapy, Application of Accelerators in Research and Industry- Sixteenth International Conf., American Institute of Physics, Nov. 1-5, 2000, vol. 576, pp. 861-864.

Coutrakon et al., a prototype beam delivery system for the proton medical accelerator at Loma Linda, Medical Physics, Nov/Dec 1991, 18(6):1093-1099.

(56) References Cited

OTHER PUBLICATIONS

Cuttone, Applications of a Particle Accelerators in Medical Physics, Istituto Nazionale di Fisica Nucleare-Laboratori Nazionali del Sud, V.S. Sofia, 44 Cantania, Italy, Jan. 2010, 17 pages.
Cuttone, G., "Applications of a Particle Accelerators in Medical Physics," Istituto Nazionale di Fisica Nucleare-Laboratori Nazionali del Sud, V.S. Sofia, 44 Cantania, Italy (17 pp.). No. date.
Dahl P, Superconducting Magnet System, American Institute of Physics, Aip Conference Proceedings, 1987-1988, 2: 1329-1376.
Dialog Search, Jan. 31, 2005, 17 pages.
Dugan et al., Tevatron Status IEEE, Particle Accelerator Conference, Accelerator Science & Technology, 1989, pp. 426-430.
Eickhoff et al., the Proposed Accelerator Facility for Light Ion Cancer Therapy in Heidelberg, Proceedings of the 1999 Particle Accelerator Conference, New York, 1999, pp. 2513-2515.
Enchevich et al., Minimizing Phase Losses in the 680 MeV Synchrocyclotron by Correcting the Accelerating Voltage Amplitude, Atomnava Energiva, 1969, 26:(3):315-316.
Endo et al., Compact Proton and Carbon Ion Synchrotrons for Radiation Therapy, Proceedings of EPAC 2002, Paris France, 2002, pp. 2733-2735.
European Communication from corresponding European application No. 11165422.4 dated Sep. 2, 2011 (5 pages).
European Communication from corresponding European application No. 11165423.2 dated Sep. 2, 2011 (5 pages).
European Communication from European application No. 06838033.6 dated Apr. 20, 2010 (7 pages).
European Communication from European application No. 07868958.5, dated Nov. 26, 2010 (50 pages).
European Patent Office communication from European application No. 08855024.9, dated Jul. 30, 2010 (2 pages).
European Patent Office communication from European application No. 07868958.5, dated Jul. 16, 2010 (2 pages).
European Patent Office communication from European application No. 08856764.9, dated Jul. 30, 2010 (2 pages).
European Search Report from corresponding European application No. 11165422.4 dated Aug. 8, 2011 (118 pages).
European Search Report from corresponding European application No. 11165423.2 dated Aug. 8, 2011 (118 pages).
File History of U.S. Pat. No. 8,581,523 (downloaded from Pair Mar. 21, 2017).
File History of U.S. Pat. No. 8,970,137 (downloaded from Pair Mar. 21, 2017).
Flanz et al., "Operation of a Cyclotron Based Proton Therapy Facility", Massachusetts General Hospital, Boston, Ma 02114, pp. 1-4, retrieved from Internet in 2009.
Flanz et al., Large Medical Gantries, Particle Accelerator Conference, Massachusetts General Hospital, 1995, pp. 1-5.
Flanz et al., the Northeast Proton Therapy Center at Massachusetts General Hospital, Fifth Workshop on Heavy Charge Particles in Biology and Medicine, Gsi, Darmstadt, Aug. 1995, 11 pp.
Flanz et al., Treating Patients with the NPTC Accelerator Based Proton Treatment Facility, Proceedings of the 2003 Particle Accelerator Conference, 2003, pp. 690-693.
Flanz, et al., "Scanning Beam Technologies", PTCOG 2008, 28 pages.
Flood and Frazier, The Wide-Band Driven RF System for the Berkeley 88-Inch Cyclotron, American Institute of Physics, Conference Proceedings., No. 9, 1972, 459-466.
Foster and Kashikhin, Superconducting Superferric Dipole Magent with Cold Iron Core for the VLHC, IEEE Transactions on Applied Superconductivity, Mar. 2002, 12(1):111-115.
Friesel et al., Design and Construction Progress on the IUCF Midwest Proton Radiation Institute, Proceedings of EPAC 2002, 2002, pp. 2736-2738.
Fukumoto et al., A Proton Therapy Facility Plan Cyclotrons and their Applications, Proceedings of the 13th International Conference, Vancouver, Canada, Jul. 6-10, 1992, pp. 258-261.
Fukumoto, Cyclotron Versus Synchrotron for Proton Beam Therapy, KEK Prepr., No. 95-122, Oct. 1995, pp. 533-536.
Gordon, et. al., Design Study for a Compact 200 MeV Cyclotron, AIP Conference Proceedings Sixth International Cyclotron Conference, No. 9, pp. 78-86 (1972).
Gordon, M. M., Extraction Studies for a 250 MeV Superconducting Synchrocyclotron, Proceedings of the 1987 IEEE Particle Accelerator Conference: Accelerator Engineering and Technology, pp. 1255-1257 (1987).
Goto et al., Progress on the Sector Magnets for the Riken SRC, American Institute of Physics, 714 CP600, Cyclotrons and Their Applications 2001, Sixteenth International Conference, 2001, pp. 319-323.
Graffman et al., Acta Radial. Therapy Phys. Biol. 1970, 9, 1 (1970).
Graffman et al., Design Studies for a 200 MeV Proton Clinic for Radiotherapy, AIP Conference Proceedings: Cyclotrons—1972, 1972, No. 9, pp. 603-615.
Graffman, et. al. Proton radiotherapy with the Uppsala cyclotron. Experience and plans Strahlentherapie, 1985, 161(12):764-770.
Hede, Research Groups Promoting Proton Therapy Lite, Journal of the National Cancer Institute, Dec. 6, 2006, 98(23):1682-1684.
Heinz, Superconducting Pulsed Magnetic Systems for High-Energy Synchrotrons, Proceedings of the Fourth International Cryogenic Engineering Conference, May 24-26, 1972, pp. 55-63.
Hentschel et al., Plans for the German National Neutron Therapy Centre with a Hospital-Based 70 MeV Proton Cyclotron at University Hospital Essen/Germany, Cyclotrons and their Applications, Proceedings of the Fifteenth International Conference on Cyclotrons and their Applications, Caen, Franco, Jun. 14-19, 1998, pp. 21-23.
Hepburn et al., Superconducting Cyclotron Neutron Source for Therapy, International Journal of Radiation Oncology Biology Physics, vol. 3 complete, 1977, pp. 387-391.
Hirabayashi, Development of Superconducting Magnets for Beam Lines and Accelerator at KEK, IEEE Transaction on Magnetics, Jan. 1981, Mag-17(1 ):728-731.
International Search Report and Written Opinion for PCT application No. PCT/US2008/084695 dated Jan. 26, 2009 (15 pages).
International Search Report and Written Opinion from corresponding PCT application No. PCT/US2008/084695 dated Jan. 26, 2009 (13 pages).
Ishibashi and Mcinturff, Stress Analysis of Superconducting 1 OT Magnets for Synchrotron, Proceedings of the Ninth International Cryogenic Engineering Conference, May 11-14, 1982, pp. 513-516.
Ishibashi and Mcinturff, Winding Design Study of Superconducting 10 T Dipoles for a Synchrotron, IEEE Transactions on Magnetics, May 1983, Mag-19(3):1364-1367.
Jahnke et al., First Superconducting Prototype Magnets for a Compact Synchrotron Radiation Source in Operation, IEEE Transactions on Magnetics, Mar. 1988, 24(2):1230-1232.
Japanese Office action with English translation from corresponding Japanese application No. 2010- 536130 dated Jun. 4, 2013 (8 pages).
Japanese Office Action with English translation from corresponding Japanese application No. 2010- 536130 dated Feb. 10, 2014 (9 pages).
Jones and Dershem, Synchrotron Radiation from Proton in a 20 TEV, 10 TESLA Superconducting Super Collider Proceedings of the 12th International Conference on High-Energy Accelerator, Aug. 11-16, 1983, pp. 138-140.
Jones and Mills, The South African National Accelerator Centre: Particle Therapy and Isotope Production Programmes, Radiation Physics and Chemistry, Apr.- Jun. 1998, 51 ( 4-6):571578.
Jones et al., Status Report of the NAC Particle Therapy Programme, Stralentherapie and Onkologie, vol. 175, Suppl. II, Jun. 1999, pp. 30-32.
Jones, Present Status and Future Trends of Heavy Particle Radiotherapy, Cyclotrons and their Applications 1998, Proceedings of the Fifteenth International Conference on Cyclotrons and their Applications, Jun. 14-19, 1998, pp. 13-20.
Jones, Progress with the 200 MeV Cyclotron Facility at the National Accelerator Centre, Commission of the European Communities Radiation Protection Proceedings, Fifth Symposium on Neutron Dosimetry, Sep. 17-21, 1984, vol. II, pp. 989-998.

(56) References Cited

OTHER PUBLICATIONS

Jongen et al., Development of a Low-cost Compact Cyclotron System for Proton Therapy, National Institute of Radiol. Sci,1991, No. 81, DD. 189-200.
Jongen et al., Progress report on the IBA-SHI small cyclotron for cancer therapy Nuclear Instruments and Methods in Physics Research, Section B, vol. 79, issue 1-4, 1993, pp. 885-889.
Jongen et al., the proton therapy system for MGH's NPTC: equipment description and progress report, Bulletin du Cancer/Radiotherapie, Proceedings of the meeting of the European Heavy Particle Therapy Group, 1996, 83(Suppl. 1):219-222.
Jongen et al., The proton therapy system for the NPTC: Equipment Description and progress report, Nuclear Instruments and methods in physics research, 1996, Section B, 113(1 ): 522-525.
Kanai et al., Three-dimensional Beam Scanning for Proton Therapy, Nuclear Instruments and Methods in Physic Research, Sep. 1, 1983, The Netherlands, 214(23):491-496.
Karlin et al., Medical Radiology (Moscow), 1983, 28, 13.
Karlin et al., The State and Prospects in the Development of the Medical Proton Tract on the Synchrocyclotron in Gatchina, Med. Radial., Moscow, 28(3):28-32 (Mar. 1983)(German with English Abstract on end of page 32).
Kats and Druzhinin, Comparison of Methods for Irradiation Prone Patients, Atomic Energy, Feb. 2003, 94(2): 120-123.
Kats and Onosovskii, A Planar Magnetooptical System for the Irradiation of a Lying Patient with a Proton Beam from Various Directions, Instruments and Experimental Techniques, 1996, 39(1):127-131.
Kats and Onosovskii, A Simple, Compact, Flat System for the Irradiation of a Lying Patient with a Proton Beam from Different Directions, Instruments and Experimental Techniques, 1996, 39(1):132-134.
Khoroshkov et al., Moscow Hospital-Based Proton Therapy Facility Design, Am. Journal Clinical Oncology: CCT, Apr. 1994, 17(2):109-114.
Kim and Blosser, Optimized Magnet for a 250 MeV Proton Radiotherapy Cyclotron, Cyclotrons and Their Applications 2001, May 2001, Sixteenth International Conference, pp. 345-347.
Kim and Yun, A Light-Ion Superconducting Cyclotron System for Multi-Disciplinary Users, Journal of the Korean Physical Society, Sep. 2003, 43(3):325-331.
Kim et al., Construction of 8T Magnet Test Stand for Cyclotron Studies, IEEE Transactions on Applied Superconductivity, Mar. 1993, 3(1):266-268.
Kim et al., Design Study of a Superconducting Cyclotron for Heavy Ion Therapy, Cyclotrons and Their Applications 2001, Sixteenth International Conference, May 13-17 2001, pp. 324-326.
Kim et al., Trim Coil System for the Riken Cyclotron Ring Cyclotron, Proceedings of the 1997 Particle Accelerator Conference, IEEE, Dec. 1981, vol. 3, pp. 214-235 or 3422-3424, 1998.
Kim, An Eight Tesla Superconducting Magnet for Cyclotron Studies, Ph.D. Dissertation, Michigan State University, Department of Physics and Astronomy, 1994, 13 8 pages.
Kishida and Yano, Beam Transport System for the RIKEN SSC (II), Scientific Papers of the Institute of Physical and Chemical Research, Dec. 1981, 75(4):214-235.
Kleeven, W., Injection and extraction for cyclotrons, Proceedings of the Specialised CERN Accelerator School on Small Accelerators, pp. 271-286 (2006).
Koehler et al., Range Modulators for Protons and Heavy Ions, Nuclear Instruments and Methods, 1975, vol. 131, pp. 437-440.
Koehler, A.M., et al., Range Modulators for Protons and Heavy Ions, Nuclear Instruments and Methods, vol. 131, DD. 437-440 (1975).
Koto and Tsujii, Future of Particle Thera12y, Ja12anese Journal of Cancer Clinics, 2001, 47(1):95-98 [Lang.: Japanese], English abstract (htt12://sciencelinks.j12/jeast/article/200206/000020020601A05 I 1453 .nhn).
Kraft et al., Hadrontherapy in Oncology, U. Amaldi and Larrsson, editors Elsevier Science, 1994, 161 pages.
Krevet et al., Design of a Strongly Curved Superconducting Bending Magnet for a Compact Synchrotron Light Source, Advances in Cryogenic Engineering, 1988, vol. 33, pp. 25-32.
Krevet, et al, "Design of a Strongly Curved Superconducting Bending Magnet for a Compact Synchrotron Light Source", Advances in Cryogenic Engineering, vol. 33, pp. 25-32 (Dec. 3, 1988).
Laisne et al., "The Orsay 200 MeV Synchrocyclotron," IEEE Transactions on Nuclear Science, Apr. 1979, NS-26(2):1919-1922.
Larsson et al., Nature, 1958, 182:1222.
Larsson, Biomedical Program for the Converted 200-MeV Synchrocyclotron at the Gustaf Werner Institute, Radiation Research, 1985, 104:S310-S318.
Lawrence et al., Heavy particles in acromegaly and Cushing's Disease, in Endocrine and Norendocrine Hormone Producing Tumors (Year Book Medical Chicago, 1973, pp. 29-61.
Lawrence et al., Successful Treatment of Acromegaly: Metabolic and Clinical Studies in 145 Patients, the Journal of Clinical Endrocrinology and Metabolism, Aug. 1970, 31(2), 21 pages.
Lawrence et al., Treatment of Pituitary Tumors, (Excerpta medica, Amsterdam/American Elsevier, New York, 1973, pp. 253-262.
Lawrence, Cancer, 1957, 10:795.
Lecroy et al., Viewing Probe for High Voltage Pulses, Review of Scientific Instruments USA, Dec. 1960, 31(12):1354.
Lin et al., "Principles and 10 Year Experience of the Beam Monitor System at the PSI Scanned Proton Therapy Facility", Center for Proton Radiation Therapy, Paul Scherrer Institute, CH-5232, Villigen PSI, Switzerland, 2007, 21 pages.
Linfoot et al., Acromegaly, in Hormonal Proteins and Peptides, edited by C.H. Li, 1975, pp. 191-246.
Literature Keyword Search, Jan. 24, 2005, 98 pages.
Literature Search, Jan. 26, 2005, 37 pages.
Mandrillon, High Energy Medical Accelerators, EPAC 90, 2nd European Particle Accelerator Conference, Jun. 12-16, 1990, 2:54-58.
Marchand et al., "1EA Proton Pencil Beam Scanning: an Innovative Solution for Cancer Treatment," Proceedings of EPAC 2000, Vienna, Austria, 3 pages.
Marti et al., High Intensity Operation of a Superconducting Cyclotron, Proceedings of the 4th International Conference, Cyclotrons and Their Applications, Oct. 1995, pp. 45-48 (Oct. 1995).
Martin, Operational Experience with Superconducting Synchrotron Magnets Proceedings of the 1987 IEEE Particle Accelerator Conference, Mar. 16-19, 1987, vol. 3 of 3: 1379-1382.
Meote et al., ETOILE Hadrontherapy Project, Review of Design Studies Proceedings of EPAC 2002, 2002, pp. 2745-2747.
Miyamoto et al., Development of the Proton Therapy System, The Hitachi Hyoron, 79(10):775775 779 (1997) [Lang: Japanese], English abstract (http://www.hitachi.com/rev/1998/revfeb98/rev4 706.htm).
Montelius et al., The Narrow Proton Beam Therapy Unit at the Svedberg Laboratory in Uppsala, ACTA Oncologica, 1991, 30:739-745.
Moser et al., Nonlinear Beam Optics with Real Fields in Compact Storage Rings, Nuclear Instruments & Methods in Physics Research/Section B, B30, Feb. 1988, No. 1, pp. 105-109.
Moyers et al., "A Continuously Variable Thickness Scatterer for Proton Beams Using Self-compensating Dual Linear Wedges" Lorna Linda University Medical Center, Dept. Of Radiation Medicine, Lorna Linda, Ca, Nov. 2, 1992, 21 pp.
National Cancer Institute Funding (Senate-Se12tember 21,1992} (w>lvw.tbomas.loc.gov/cgibin/querv/z?r102:S21SE2-712 12 na2es).
Nicholson, Applications of Proton Beam Therapy, Journal of the American Society of Radiologic Technologists, May/Jun. 1996, 67(5): 439-441.
Nolen et al., the Integrated Cryogenic—Superconducting Beam Transport System Planned for MSU, Proceedings of the J21h International Conference on High-Energy Accelerators, Aug. 1983, pp. 549-551.
Non Final Office Action from U.S. Appl. No. 11/948,359 dated Aug. 20, 2010 (12 pages).
Non Final Office Action from U.S. Appl. No. 12/275,103 dated Feb. 1, 2011 (6 pages).

(56) References Cited

OTHER PUBLICATIONS

Non Final Office Action from U.S. Appl. No. 12/618,297 dated May 13, 2011 (44 pages).
Norimine et al., a Design of a Rotating Gantry with Easy Steering for Proton Therapy, Proceedings of EPAC 2002, 2002, pp. 2751-2753.
Office action from U.S. Appl. No. 11/948,359, dated Aug. 20, 2010 (12 pages).
Office action with English translation dated Feb. 10, 2014 from corresponding Japanese application No. 2010-536130 ( 5 pages).
Okumura et al., Overview and Future Prospect of Proton Radiotherapy, Japanese Journal of Cancer Clinics, 1997, 43(2):209-214 [Lang: Japanese].
Okumura et al., Proton Radiotherapy Japanese Journal of Cancer and Chemotherapy, 1993, 10. 20(14):2149-2155[Lang.: Japanese].
Outstanding from Search Reports, Accelerator of Polarized Portons at Fermilab, 2005, 20 pages.
Palmer and Tollestrup, Superconducting Magnet Technology for Accelerators, Annual Review of Nuclear and Particle Science, 1984, vol. 34, pp. 247-284.
Pardo, J. et al., Simulation of the performance of the Cnao facility's Beam Delivery System, PTCOG 46, Zibo, China, 17 pages (2007).
Patent Assignee and Keyword Searches for Synchrocyclotron, Jan. 25, 2005, 78 pages.
Pavlovic, Beam-optics study of the gantry beam delivery system for light-ion cancer therapy, Nuclear Instruments and Methods in Physics Research, Section A, Nov. 1997, 399(2):439-454(16).
Pedroni and Enge, Beam optics design of compact gantry for proton therapy Medical & Biological Engineering & Computing, May 1995, 33(3):271-277.
Pedroni and Jermann, Sgsmp: Bulletin Mar. 2002 Proscan Project, Progress Report on the Proscan.
Pedroni et al., A Novel Gantry for Proton Therapy at the Paul Scherrer Institute, Cycloctrons and Their Applications 2001: Sixteenth International Conference. Aip Conference Proceedings, 2001, 600:13-17.
Pedroni et al., the 200-MeV proton therapy project at the Paul Scherrer Institute: Conceptual design and practical realization, Medical Physics, Jan. 1995, 22(1 ):37-53.
Pedroni, "Status of Proton Therapy: results and future trends," Paul Scherrer Institute, Division of Radiation Medicine, 1994, 5 pages.
Pedroni, Accelerators for Charged Particle Therapy: Performance Criteria from the User Point of View, Cyclotrons and their Applications, Proceedings of the 13th International Conference, Jul. 6-10, 1992, pp. 226-233.
Pedroni, Latest Developments in Proton Therapy Proceedings of Epac 2000, pp. 240-244, 2000.
Potts et al., MPWP6-Therapy Iii: Treatment Aids and Techniques Medical Physics, Sep/Oct 1988, 15(5):798.
Pourrahimi et al., Powder Metallurgy Processed Nb3Sn(Ta) Wire for High Field NMR magnets, IEEE Transactions on Applied Superconductivity, Jun. 1995, 5(2):1603-1606.
Prieels et al., The IBA State-of-the-Art Proton Therapy System, Performances and Recent Results, Application of Accelerators in Research and industry—Sixteenth Int'l Conj, American Institute of Physics, Nov 1-5, 2000, 576:857-860.
Rabin et al., Compact Designs for Comprehensive Proton Beam Clinical Facilities, Nuclear Instruments & Methods in Physics Research, Apr. 1989, Section B, vol. 40-41, Part II, pp. 1335-1339.
Renner et al., "Preliminary Results of a Raster Scanning Beam Delivery System", IEEE, 1989, 3 pages.
Research & Development Magazine, Proton Therapy Center Nearing Completion, Aug. 1999, 41(9):2 pages (www.rdmag.com).
Resmini Design Characteristics of the K=800 Superconducting Cyclotron at M.S.U., Cyclotron Laboratory, Michigan State University, East Lansing, Michigan 48824, IEEE Transaction on Nuclear Science, vol. NS-26, No. 2, Apr. 1979, 8 pages.
Response to Non Final Office Action dated Feb. 1, 2011 in U.S. Appl. No. 12/275,103 filed May 2, 2011 (13 pages).
Response to Office Action dated Aug. 20, 2010 in U.S. Appl. No. 11/948,359 filed Feb. 22, 2011 (17 pages).
Response with English translation to Japanese Office action dated Feb. 10, 2014 from corresponding Japanese application No. 2010-536130, filed May 8, 2014 (15 pages).
Revised Patent Keyword Search, Jan. 25, 2005, 86 pages.
Rifuggiato et, al., Status Report of the LNS Superconducting Cyclotron Nukleonika, 2003, 48:SI31-SI34, Supplement 2.
Rode, Tevatron Cryogenic System, Proceedings of the 12th International Conference on Highenergy Accelerators, Fermilab, Aug. 11-16, 1983, pp. 529-535.
Salzburger et al., "Superconducting Synchrotron Magnets Supraleitende Synchrotronmagnete," Siemens A.G., Erlangen (West Germany).
Abteilung Technische Physik, Report No. BMFT-FB-T-75-25, Oct. 1975, p. 147, Journal Announcement: GRA17619; STAR1415,Subm-Sponsored by Bundesmin. Fuer Forsch. U. Technol. In German; English Summary.
Salzburger et al., Superconducting Synchrotron Magnets Supraleitende Synchrotronmagnete, NTiS, 155 pages (Oct. 1975).
Schillo et al,. Compact Superconducting 250 MeV Proton Cyclotron for the PSI Proscan Proton Therapy Project, Cyclotrons and Their Applications 2001, Sixteenth International Conference, 2001, pp. 37-39.
Schneider et al., Nevis Synchrocyclotron Conversion Program—RF System, IEEE Transactions on Nuclear Science USA, Jun. 1969, ns. 16(3): 430-433.
Schreuder et al., The Non-orthogonal Fixed Beam Arrangement for the Second Proton Therapy Facility at the National Accelerator Centre, Application of Accelerators in Research and Industry, American Institute of Physics, Proceedings of the Fifteenth International Conference, Nov 1998, Part Two, pp. 963-966.
Schreuder, Recent Developments in Superconducting Cyclotrons, Proceedings of the 1995 Particle Accelerator Conference, May 1-5, 1995, vol. 1, pp. 317-321.
Schubert and Blosser, Conceptual Design of a High Field Ultra-Compact Cyclotron for Nuclear Physics Research, Proceedings of the 1997 Particle Accelerator Conference, May 12-16, 1997, vol. 1, 3 pages 1060-1062.
Schubert, Extending the Feasibility Boundary of the Isochronous Cyclotron, Dissertation submitted to Michigan State University, 1997, Abstract http://adsabs.harvard.edu/abs/1998PhDT. . . 147S.
Shelaev et al., Design Features of a Model Superconducting Synchrotron of JINR, Proceedings of the 12th International Conference on High-energy Accelerators, Aug. 11-16, 1983, pp. 416-418.
Shintomi et. Al, Technology and Materials for the Superconducting Super Collider (SSC) Project, [Lang.: Japanese], The Iron and Steel Institute of Japan 00211575, 78(8): 1305-1313, 1992, http://ci.nii.ac.ip/naid/I I 0001493249/en/.
Sisterson, Clinical use of proton and ion beams from a world-wide perspective, Nuclear Instruments and Methods in Physics Research, Section B, 1989, 40-41:1350-1353.
Sisterson, World Wide Proton Therapy Experience in 1997, The American Institute of Physics, Applications of Accelerators in Research and Industry, Proceedings of the Fifteenth International Conference, Part Two, Nov 1998, pp. 959-962.
Slater et al., Developing a Clinical Proton Accelerator Facility: Consortium-Assisted Technology Transfer, Conference Record of the 1991 IEEE Particle Accelerator Conference: Accelerator Science and Technology, vol. I, May 6-9, 1991, pp. 532-536.
Slater et al., Development of a Hospital-Based Proton Beam Treatment Center, International Journal of Radiation Oncology J Biolog J Physics, Apr. 1988, 14(4):761-775.
Smith et al., the Northeast Proton Therapy Center at Massachusetts General Hospital Journal of Brachytherapy International, Jan. 1997, pp. 137-139.
Snyder and Marti, Central region design studies for a proposed 250 MeV proton cyclotron, Nuclear Instruments and Methods in Physics Research, Section A, 1995, vol. 355, pp. 618-623.
Soga, Progress of Particle Therapy in Japan, Application of Accelerators in Research and Industry, American Institute of Physics, Sixteenth International Conference, Nov. 2000, pp. 869-872.

(56) References Cited

OTHER PUBLICATIONS

Spiller et al., The GSI Synchrotron Facility Proposal for Acceleration of High Intensity Ion and Proton Beams Proceedings of the 2003 Particle Accelerator Conference, May 12-16, 2003, vol. 1, pp. 589-591.
Stanford et al., "Method of Temperature Control in Microwave Ferroelectric Measurements," Sperry Microwave Electronics Company, Clearwater, Florida, Sep. 19, 1960, 1 page.
Superconducting Cyclotron Contract awarded by Paul Scherrer Institute (PSI), Villigen, Switzerland, http://www.accel.de/News/superconducting_ cyclotron_ contract.htm, Jan. 2009, 1 page.
Tadashi et al., "Large superconducting super collider (SSC) in the planning and materials technology," 1992, 78(8):1305-1313, the Iron and Steel Institute of Japan 00211575.
Tadashi et al., Large superconducting super collider (SSC) in the planning and materials technology,78(8):1305-1313, The Iron and Steel Institute of Japan 00211575, Aug. 1992.
Takada, Conceptual Design of a Proton Rotating Gantry for Cancer Therapy, Japanese Journal of Medical Physics, 1995, 15(4):270-284.
Takayama et al., Compact Cyclotron for Proton Therapy, Proceedings of the 81 h Symposium on Accelerator Science and Technology, Japan, Nov. 25-27, 1991, pp. 380-382.
Teng, The Fermilab Tevatron, Coral Gables 1981, Proceedings, Gauge Theories, Massive Neutrinos, and Proton Decay, 1981, pp. 43-62.
The Davis 76-Inch Isochronous Cyclotron, Beam On: Crocker Nuclear Laboratory, University of California, 2009, 1 page.
The Journal of Practical Pharmacy,1995, 46(1):97-103 [Japanese].
The K100 Neutron-therapy Cyclotron, National Superconducting Cyclotron Laboratory at Michigan State University (NSCL ), retrieved from: http://www.nscl.msu.edu/tech/accelerators/kl00, Feb. 2005, 1 page.
The K250 Proton therapy Cyclotron, National Superconducting Cyclotron Laboratory at Michigan State University (NSCL), retrieved from: http://www.nscl.msu.edu/tech/accelerators/k.250.html, Feb. 2005, 2 pages.
The K250 Proton-therapy Cyclotron Photo Illustration, National Superconducting Cyclotron Laboratory at Michigan State University (NSCL), retrieved from: http://www.nscl.msu.edu/media/image/ experimental-equipment-technology /25 0 .html, Feb. 2005, 1 page.
Timmer, "The ACCEL Single Room Proton Therapy Facility" ACCEL Instruments GmbH, PTCOG 45, Oct. 2006, Houston, Texas, 18 pages.
Tobias et al., Cancer Research,1958, 18, 121 (1958).
Tom, The Use of Compact Cyclotrons for Producing Fast Neutrons for Therapy in a Rotatable Isocentric Gantry, IEEE Transaction on Nuclear Science, Apr. 1979, 26(2):2294-2298.
Toyoda, Proton Therapy System, Sumitomo Heavy Industries, Ltd., 2000, 5 pages.
Trinks et. al., The Tritron: A Superconducting Separated-Orbit Cyclotron, Nuclear Instruments and Methods in Physics Research, Section A, 1986, vol. 244, pp. 273-282.
Tsuji, The Future and Progress of Proton Beam Radiotherapy, Journal of Japanese Society for Therapeutic Radiology and Oncology, 1994, 6(2):63-76.
UC Davis School of Medicine, Unlikely Partners Tum Military Defense into Cancer Offense, Current Issue Summer 2008, Sacramento, California, pp. 1-2.
Umegaki et al., Development of an Advanced Proton Beam Therapy System for Cancer Treatment Hitachi Hyoron, 2003, 85(9):605-608 [Lang.: Japanese], English abstract, http://www.hitachi.com/ICSFiles/afieldfile/2004/06/01/r2003_ 04_ I 04.pdf or http://www.hitachi.com/rev/archive/2003/2005649_12606.html (full text) [Hitachi, 52(4), Dec. 2003].
Umezawa et al., Beam Commissioning of the new Proton Therapy System for University of Tsukuba, Proceedings of the 2001 Particle Accelerator Conference, vol. 1, Jun. 18-22, 2001, pp. 648-650.
van Steenbergen, Superconducting Synchroton Development at Bnl, Proceedings of the 8th International Conference on High-Energy Accelerators CERN 1971, 1971, pp. 196-198.
van Steenbergen, the CMS, a Cold Magnet Synchrotron to Upgrade the Proton Energy Range of the BNL Facility, IEEE Transactions on Nuclear Science, Jun. 1971, 18(3):694-698.
Vandeplassche et al., 235 MeV Cyclotron for Mgh's Northeast Proton Therapy Center (NPTC): Present Status, EPAC 96, Fifth European Partical Accelerator Conference, vol. 3, Jun. 10-14, 1996, pp. 2650-2652.
Vorobiev et al., Concepts of a Compact Achromatic Proton Gantry with a Wide Scanning Field, Nuclear Instruments and Methods in Physics Research, Section A., 1998, 406(2):307-310.
Vrenken et al., A Design of a Compact Gantry for Proton Therapy with 2D-Scanning, Nuclear Instruments and Methods in Physics Research, Section A, 1999, 426(2):618-624.
Welton, R. F., RF-Plasma Coupling Schemes for the SNS Ion Source, AIP Conference Proceedings, vol. 694, Jan. 1, 2003 (Jan. 1, 2003), pp. 431-438, XP055119965.
Wikipedia, Cyclotron http://en.wiki11edia.org/wiki/Cyclotron (originally visited Oct. 6, 2005, revisited Jan. 28, 2009), 7 pages.
Wikipedia, Synchrotron http://en.wiki1ledia.org/wiki/Synchrotron (originally visited Oct. 6, 2005, revisited Jan. 28, 2009), 7 pages.
Wu, Conceptual Design and Orbit Dynamics in a 250 MeV Superconducting Synchrocyclotron, Ph.D. Dissertation, Michigan State University, Department of Physics and Astronomy, 1990, 172 pp.
Yamaya a, T., et al.: A Small Cold Cathode Heavy Ion Source for a Compact Cyclotron, Nuclear Instruments and Methods in Physics Research, vol. 226, 1 Jan. 1984 (1984-0101), pp. 219-222, XP055119506.
York et al., Present Status and Future Possibilities at NSCL-MSU, EP AC 94, Fourth European Particle Accelerator Conference, pp. 554-556, Jun. 1994.
York et al., the NSCL Coupled Cyclotron Project—Overview and Status, Proceedings of the Fifteenth International Conference on Cyclotrons and their Applications, Jun. 1998, pp. 687-691.
Yudelev et al., Hospital Based Superconducting Cyclotron for Neutron Therapy: Medical Physics Perspective, Cyclotrons and their applications 2001, 16th International Conference. American Institute of Physics Conference Proceedings, vol. 600, May 13-17, 2001, pp. 4043.
Zherbin et al., Proton Beam Therapy at the Leningrad Synchrocyclotron (Clinicomethodological Aspects and Therapeutic Results), Aug. 1987, 32(8):17-22, (German with English abstract on pp. 21-22).
Livingston, M. S., et. al. "A Capillary Ion Source for the Cyclotron" *Review Science Instruments*, vol. 10:63, pp. 63-67, (Feb. 1939).
English Translation of Notification of Reasons for Rejection in counterpart Japanese Application No. 2010-536130 dated Jun. 4, 2013.
Response to Office Action with English translation issued in corresponding Japanese Application No. 2010-536130, filed on Nov. 26, 2013 (24 pages).
Office action with English translation issued Feb. 10, 2014 from corresponding Japanese application No. 2010-536130 (5 pages).
Office action and response history of U.S. Appl. No. 11/601,056 to Mar. 24, 2009.
U.S. Appl. No. 60/738,404, filed Nov. 18, 2005.
U.S. Appl. No. 11/948,359, filed Nov. 30, 2007.
PCT application No. PCT/US2006/44853, filed on Nov. 17, 2006, with Publication No. WO/2007/061937.
U.S. Appl. No. 10/949,734, filed Sep. 24, 2004, Patent No. 7,208,748, issued on Apr. 24, 2007.
U.S. Appl. No. 11/724,055, filed Mar. 14, 2007.
U.S. Appl. No. 11/371,622, filed Mar. 9, 2006.
U.S. Appl. No. 60/590,088, filed Jul. 21, 2004.
U.S. Appl. No. 11/187,633, filed Jul. 21, 2005.
PCT application No. PCT/US2005/25942 filed on Jul. 21, 2005, with Publication No. WO/2006/012452.
U.S. Appl. No. 11/463,403, filed Aug. 9, 20006.
U.S. Appl. No. 11/517,490, filed Sep. 7, 2006.
U.S. Appl. No. 11/624,769, filed Jan. 19, 2007.

(56) References Cited

OTHER PUBLICATIONS

PCT application No. PCT/US2007/01506 filed on Jan. 19, 2007, with Publication No. WO/2007/084701.
PCT application No. PCT/US2007/01628 filed on Jan. 19, 2007, with Publication No. WO/2007/130164.
PCT application No. PCT/US2007/77693 filed on Sep. 6, 2007with Publication No. WO/2007/77693.
U.S. Appl. No. 11/870,961, filed Oct. 11, 2007.
PCT application No. PCT/US2008/077513, filed on Sep. 24, 2008.
PCT application No. PCT/US2008/084695 filed on Nov. 25, 2008.
PCT application No. PCT/US2008/084699 filed on Nov. 25, 2008.
U.S. Appl. No. 60/991,454, filed Nov. 30, 2007.
U.S. Appl. No. 12/275,103, filed Nov. 20, 2008.
PCT application No. PCT/US2007/086109 filed on Nov. 30, 2007.
U.S. Appl. No. 60/850,565, filed Oct. 10, 2006.
PCT International Search report and Written Opinion of PCT application No. PCT/US2006/044853, mailed Oct. 5, 2007 (12 pages).
PCT International Preliminary Report on Patentability of corresponding PCT application No. PCT/US2006/044853, mailed May 29, 2008 (8 pages).
International Search Report dated Aug. 26, 2008 in PCT application No. PCT/US2007/086109 (6 pages).
Written Opinion dated Aug. 26, 2008 in PCT application No. PCT/US2007/086109 (6 pages).
International Search Report and Written Opinion for PCT application No. PCT/US2008/084699 mailed Feb. 4, 2009 (11 pages).
International Search Report and Written Opinion for PCT application No. PCT/US2007/001506 mailed Jul. 5, 2007, Publication No. W02007/084701, Published Jul. 26, 2007 (14 pages).
International Preliminary Report on Patentability for PCT application No. PCT/US2007/001506 mailed Jul. 5, 2007 (15 pages).
International Search Report for PCT/US2007/001628 mailed Feb. 18, 2008 (4 pages).
Written Opinion for PCT/US2007/001628, mailed Feb. 18, 2008 (11 pages).
International Preliminary Report on Patentability for PCT/US2007/001628, mailed Apr. 22, 2008 (15 pages).
Abrosimov, N.K., et al. Proc. Academy Science, USSR 5, 84 (1985).
Abrosimov, N.K., et al, "1000MeV Proton Beam Therapy facility at Petersburg Nuclear Physics Institute Synchrocyclotron", Medical Radiology (Moscow) 32, 10 (1987) revised in Journal of Physics, Conference Series 41, pp. 424-432, Institute of Physics Publishing Limited, 2006.
Adachi, T., et. al. "A 150MeV FFAG Synchrotron with "Return-Yoke Free" Magent" *Proceedings of the 2001 Particle Accelerator Conference*, Chicago (2001).
Ageyev, A. I., et. al. "The IHEP Accelerating and Storage Complex (UNK) Status Report" *11th International Conference on High-Energy Accelerators*, pp. 60-70 (Jul. 7-11, 1980).
Agosteo, S., et. al. "Maze Design of a gantry room for proton therapy" *Nuclear Instruments & Methods in Physics Research*, Section A, 382, pp. 573-582 (1996).
Allardyce, B. W., et al., "Performance and Prospects of the Reconstructed CERN 600 MeV Synchrocyclotron" IEEE Transactions on Nuclear Science USA ns-24:(3), pp. 1631-1633 (Jun. 1977).
Alexeev, V. P., et. al. "R4 Design of Superconducting Magents for Proton Synchrotrons" *Proceedings of the Fifth International Cryogenic Engineering Conference*, pp. 531-533 (1974).
Amaldi, U. "Overview of the world landscape of Hadrontherapy and the projects of the TERA foundation" *Physica Medica, An International journal Devoted to the Applications of Physics to Medicine and Biology*, vol. XIV, Supplement 1 (Jul. 1998), *6th Workshop on Heavy Charged Particles in Biology and Medicine*, Instituto Scientific Europeo (ISE), Baveno, pp. 76-85 (Sep. 29-Oct. 1, 1997).
Amaldi, U., et. al. "The Italian project for a hadrontherapy centre" *Nuclear Instruments and Methods in Physics Research A*, 360, pp. 297-301 (1995).
"An Accelerated Collaboration Meets with Beaming Success", Lawrence Livermore National Laboratory, Apr. 12, 2006, S&TR,,Livermore, California, pp. 1-3. http: //www.llnl.gov/str/April06/Caporaso.html.
Anferov, V., et. al. "The Indiana University Midwest Proton Radiation Institute" *Proceedings of the 2001 Particle Accelerator Conference*, Chicago, pp. 645-647 (2001).
Anferov, V., et. al. "Status of the Midwest Proton Radiotherapy Institute", *Proceedings of the 2003 Particle Accelerator Conference*, pp. 699-701 (2003).
Appun, J. "Various problems of magnet fabrication for high-energy accelerators" *Journal for All Engineers Interested in the Nuclear Field*, pp. 10-16 (1967) [Lang.: German], English bibliographic information (http://www.osti.gov/energycitations/product.biblio.jsp?osti_id=4442292).
Arduini, G., et. al. "Physical specifications of clinical proton beams from a synchrotron" *Med. Phys.* 23 (6), pp. 939-951 (Jun. 1996).
Beeckman, W., et. al. "Preliminary design of a reduced cost proton therapy facility using a compact, high field isochronous cyclotron" *Nuclear Instruments and Methods in Physics Reasearch* B56/57, pp. 1201-1204 (1991).
Bellomo, G., et al., "The Superconducting Cyclotron Program at Michigan State University" *Bulletin of the American Physical Society*, vol. 25, No. 7, pp. 767 (Sep. 1980).
Benedikt, M. and Carli, C. "Matching to Gantries for Medical Synchrotrons" *IEEE Proceedings of the 1997 Particle Accelerator Conference*, pp. 1379-1381 (1997).
Bieth, C., et. al. "A Very Compact Protontherapy Facility Based on an Extensive Use of High Temperature Superconductors (HTS)" *Cyclotrons and their Applications 1998, Proceedings of the Fifteenth International Conference on Cyclotrons and their Applications*, Caen, pp. 669-672 (Jun. 14-19, 1998).
Bigham, C.B. "Magnetic Trim Rods for Superconducting Cyclotrons," Nuclear Instruments and Methods (North-Holland Publishing Co.) 141 (1975), pp. 223-228.
Blackmore, E. W., et. al. "Operation of the Triumf Proton Therapy Facility" *IEEE Proceedings of the 1997 Particle Accelerator Conferenc*, vol. 3, pp. 3831-3833 (May 12-16, 1997).
Bloch, C. "The Midwest Proton Therapy Center" *Application of Accelerators in Research and Industry, Proceedings of the Fourteenth Int'l. Conf.*, Part Two, pp. 1253-1255 (Nov. 1996).
Blosser, H., et. al. "A Compact Superconducting Cyclotron for the Production of High Intensity Protons" *Proceedings of the 1997 Particle Accelerator Conference*, vol. 1, pp. 1054-1056 (May 12-16, 1997).
Blosser, H., et al., "Advances in Superconducting Cyclotrons at Michigan State University", Proceedings of the 11$^{th}$ International Conference on Cyclotrons and their Applications, pp. 157-167 (Oct. 1986), Tokyo.
Blosser, H., "Application of Superconductivity in Cyclotron Construction", *Ninth International Conference on Cyclotrons and their Applications*, pp. 147-157 (Sep. 1981).
Blosser, H. "Applications of Superconducting Cyclotrons" *Twelfth International Conference on Cyclotrons and Their Applications*, pp. 137-144 (May 8-12, 1989).
Blosser, H., et al., "Characteristics of a 400 (Q2/A) MeV Super-Conducting Heavy-Ion Cyclotron", Bulletin of the American Physical Society, p. 1026 (Oct. 1974).
Blosser, H. G. "Compact Superconducting Synchrocyclotron Systems for Proton Therapy" *Nuclear Instruments & Methods in Physics Research*, Section B40-41, Part II, pp. 1326-1330 (Apr. 1989).
Blosser, H.G., "Future Cyclotrons" *AIP, The Sixth International Cyclotron Conference*, pp. 16-32 (1972).
Blosser, H., et. al. "Medical Accelerator Projects at Michigan State Univ." *IEEE Proceedings of the 1989 Particle Accelerator Conference*, vol. 2, pp. 742-746 (Mar. 20-23, 1989).
Blosser, H.G., "Medical Cyclotrons", *Physics Today*, Special Issue Physical Review Centenary, pp. 70-73 (Oct. 1993).
Blosser, H., et al, National Superconducting Cyclotron Laboratory, Michigan State University, Report MSUCL-760, Nov. 2013.

(56) References Cited

OTHER PUBLICATIONS

Blosser, H., et al., "Preliminary Design Study Exploring Building Features Required for a Proton Therapy Facility for the Ontario Cancer Institute", MSUCL-760a (Mar. 1991).
Blosser, H., Present and Future Superconducting Cyclotrons, *Bulletin of the American Physical Society*, vol. 32, No. 2, p. 171 (Feb. 1987), Particle Accelerator Conference, Washington, D.C. 1987.
Blosser, H., et al., "Problems and Accomplishments of Superconducting Cyclotrons", Proceedings of the 14th International Conference, Cyclotrons and Their Applications, pp. 674-684 (Oct. 1995).
Blosser, H.G., "Program on the Coupled Superconducting Cyclotron Project", *Bulletin of the American Physical Society*, vol. 26, No. 4, p. 558 (Apr. 1981).
Blosser, H., et al., "Superconducting Cyclotron for Medical Application", *IEEE Transactions on Magnetics*, vol. 25, No. 2, pp. 1746-1754 (Mar. 1989).
Blosser, H.G., et al., "Superconducting Cyclotrons", Seventh International Conference on Cyclotrons and their Applications, pp. 584-594 (Aug. 19-22, 1975).
Blosser, H.G., "Superconducting Cyclotrons at Michigan State University", Nuclear Instruments & Methods in Physics Research, vol. B 24/25, part II, pp. 752-756 (1987).
Blosser, H. G. "Synchrocyclotron Improvement Programs" *IEEE Transactions on Nuclear Science USA*, vol. 16, No. 3, Part I, pp. 405-414 (Jun. 1969).
Blosser, H.G., "The Michigan State University Superconducting Cyclotron Program", Nuclear Science, vol. NS-26, No. 2, pp. 2040-2047 (Apr. 1979).
Botha, A. H., et. al. "A New Multidisciplinary Separated-Sector Cyclotron Facility" IEEE Transactions on Nuclear Science, vol. NS-24, No. 3, pp. 1118-1120 (1977).
Chichili, D.R., et al., "Fabrication of Nb3Sn Shell-Type Coils with Pre-Preg Ceramic Insulation," American Institute of Physics Conference Proceedings, AIP USA, No. 711, (XP-002436709, ISSN: 0094-243X), 2004, pp. 450-457.
Chong, C.Y., et al., Radiology Clinic North American 7, 3319 (1969).
Chu, et. al. "Instrumentation for Treatment of Cancer Using Proton and Light-ion Beams" Review of Scientific Instruments, 64 (8), pp. 2055-2122 (Aug. 1993).
Cole, et. al. "Design and Application of a Proton Therapy Accelerator", Fermi National Accelerator Laboratory, IEEE, 1985.
Conradie, et. al. "Proposed New Facilities for Proton Therapy at iThemba Labs" Proceedings of EPAC, pp. 560-562 (2002).
C/E Source of Ions for Use in Sychro-Cyclotrons Search, Jan. 31, 2005, 9 pages.
Source Search Cites of U.S. and Foreign Patents/Published applications in the name of Mitsubishi Denki Kabushiki Kaisha and Containing the Keywords (Proton and Synchrocyclotron), 8 pages, Apr. 1957.
Coupland, . "High-field (5 T) pulsed superconducting dipole magnet" Proceedings of the Institution of Electrical Engineers, vol. 121, No. 7, pp. 771-778 (Jul. 1974).
Coutrakon, et. al. "A prototype beam delivery system for the proton medical accelerator at Loma Linda" Medical Physics, vol. 18(6), pp. 1093-1099 (Nov./Dec. 1991).
Coutrakon, G et al. "Proton Synchrotrons for Cancer Therapy" Application of Accelerators in Research and Industry—Sixteenth International Conf., American Institute of Physics, vol. 576, pp. 861-864 (Nov. 1-5, 2000).
"CPAC Highlights Its Proton Therapy Program at ESTRO Annual Meeting", TomoTherapy Incorporated, Sep. 18, 2008, Madison, Wisconsin, pp. 1-2.
Dialog Search, Jan. 31, 2005 (18 pages).
"Indiana's mega-million proton therapy cancer center welcomes its first patients" [online] Press release, Health & Medicine Week, 2004, retrieved from NewsRx.com, Mar. 1, 2004, pp. 119-120.
Ishibashi, K. and McInturff, A., "Stress Analysis of Superconducting 10T Magnets for Synchrotron", Proceedings of the Ninth International Cryogenic Engineering Conference, pp. 513-516 (May 11-14, 1982).
Ishibashi, K. and McInturff, A. "Winding Design Study of Superconducting 10 T Dipoles for a Synchrotron" *IEEE Transactions on Magnetics*, vol. MAG-19, No. 3, pp. 1364-1367 (May 1983).
Jahnke, A., et. al. "First Superconducting Prototype Magnets for a Compact Synchrotron Radiation Source in Operation" IEEE Transactions on Magnetics, vol. 24, No. 2 (Mar. 1988), pp. 1230-1232.
Jones, D.T.L. "Progress with the 200 MeV Cyclotron Facility at the National Accelerator Centre" *Commission of the European Communities Radiation Protection Proceedings, Fifth Symposium on Neutron Dosimetry*, vol. II, pp. 989-998 (Sep. 17-21, 1984).
Jones, D. T. L. "Present Status and Future Trends of Heavy Particle Radiotherapy" *Cyclotrons and their Applications 1998, Proceedings of the Fifteenth International Conference on Cyclotrons and their Applications*, pp. 13-20 (Jun. 14-19, 1998).
Jones, and Dershem . "Synchrotron Radiation from Proton in a 20 TEV, 10 TESLA Superconducting Super Collider" *Proceedings of the 12th International Conference on High-Energy Accelerators*, pp. 138-140 (Aug. 11-16, 1983).
Jones, D. T. L. and Mills, S. J. "The South African National Accelerator Centre: Particle Therapy and Isotope Production Programmes" *Radiation Physics and Chemistry*, vol. 51, Nos. 4-6, pp. 571-578 (Apr.-Jun. 1998).
Jones, D. T. L., et. al. "Status Report of the NAC Particle Therapy Programme" *Stralentherapie und Onkologie*, vol. 175, Suppl. II, pp. 30-32 (Jun. 1999).
Jongen, Y., et. al. "Progress report on the IBA-SHI small cyclotron for cancer therapy" *Nuclear Instruments and Methods in Physics Research*, Section B, vol. 79, issue 1-4, pp. 885-889 (1993).
Jongen, Y., et. al. "The proton therapy system for MGH's NPTC: equipment description and progress report" *Bulletin du Cancer/Radiotherapie, Proceedings of the meeting of the European Heavy Particle Therapy Group*, vol. 83, Suppl. 1, pp. 219-222 (1996).
Jongen, Y., et. al. "Development of a Low-cost Compact Cyclotron System for Proton Therapy" *National Institute of Radiol. Sci,*, No. 81, pp. 189-200 (1991).
Jongen, Y. et. al. "The proton therapy system for the NPTC: equipment description and progress report" *Nuclear Instruments and methods in Physics Research*, Section B, vol. 113, No. 1, pp. 522-525 (1996).
Kanai, et al., "Three-dimensional Beam Scanning for Proton Therapy," *Nuclear Instruments and Methods in Physic Research*, Sep. 1, 1983, The Netherlands, vol. 214, No. 23, pp. 491-496.
Karlin, D.L., et al., "Medical Radiology" (Moscow) 28, 13 (1983).
Karlin, D.L., et al., "The State and Prospects in the Development of the Medical Proton Tract on the Synchrocyclotron in Gatchina", Med. Radiol., Moscow, vol. 28(3), pp. 28-32 (Mar. 1983)(German with English Abstract on end of p. 32).
Kats, M.M. and Druzhinin, B.L. "Comparison of Methods for Irradiation Prone Patients" *Atomic Energy*, vol. 94, No. 2, pp. 120-123 (Feb. 2003).
Kats, M. M. and Onosovskii, K. K. "A Planar Magnetooptical System for the Irradiation of a Lying Patient with a Proton Beam from Various Directions" *Instruments and Experimental Techniques*, vol. 39, No. 1, pp. 127-131 (1996).
Kats, M. M. and Onosovskii, K. K. "A Simple, Compact, Flat System for the Irradiation of a Lying Patient with a Proton Beam from Different Directions" Instruments and Experimental Techniques, vol. 39, No. 1, pp. 132-134 (1996).
Koehler, A.M., et al., "Range Modulators for Protons and Heavy Ions," Nuclear Instruments and Methods, vol. 131, pp. 437-440 (1975).
Khoroshkov, V. S., et. al. "Moscow Hospital-Based Proton Therapy Facility Design" *Am. Journal Clinical Oncology: CCT*, vol. 17, No. 2, pp. 109-114 (Apr. 1994).
Kim, J. and Yun, C. "A Light-Ion Superconducting Cyclotron System for Multi-Disciplinary Users" *Journal of the Korean Physical Society*, vol. 43, No. 3, pp. 325-331 (Sep. 2003).

(56) References Cited

OTHER PUBLICATIONS

Kim, J.W., "An Eight Tesla Superconducting Magnet for Cyclotron Studies," Ph.D. Dissertation, Michigan State University, Department of Physics and Astronomy (1994).
Kim, J., et al., "Construction of 8T Magnet Test Stand for Cyclotron Studies", *IEEE Transactions on Applied Superconductivity*, vol. 3, No. 1, pp. 266-268 (Mar. 1993).
Kim, J., et al., "Design Study of a Superconducting Cyclotron for Heavy Ion Therapy", *Cyclotrons and Their Applications 2001, Sixteenth International Conference*, pp. 324-326 (May 13-17, 2001).
Kim, J. and Blosser, H., "Optimized Magnet for a 250 MeV Proton Radiotherapy Cyclotron", *Cyclotrons and Their Applications 2001, Sixteenth International Conference*, pp. 345-347 (May 2001).
Kim, J.W., et al., "Trim Coil System for the Riken Cyclotron Ring Cyclotron", *Proceedings of the 1997 Particle Accelerator Conference, IEEE*, vol. 3, pp. 214-235 (Dec. 1981). OR 3422-3424, 1998).
Kishida, N. and Yano, Y. "Beam Transport System for the Riken SSC (II)" *Scientific Papers of the Institute of Physical and Chemical Research*, vol. 75, No. 4, pp. 214-235 (Dec. 1981).
Koto, M. and Tsujii, H. "Future of Particle Therapy" *Japanese Journal of Cancer Clinics*, vol. 47, No. 1, pp. 95-98 (2001) [Lang.: Japanese], English abstract (http://sciencelinks.jp/j-east/article/200206/000020020601A0511453.php).
Kraft, G. et al., "Hadrontherapy in Oncology", U. Amaldi and Larrsson, editors Elsevier Science, 1994.
Krevet, et al, "Design of a Strongly Curved Superconducting Bending Magnet for a Compact Synchrotron Light Source", Advances in Cryogenic Engineering, vol. 33, pp. 25-32, 2013.
Larsson, B. "Biomedical Program for the Converted 200-MeV Synchrocyclotron at the Gustaf Werner Institute" *Radiation Research*, 104, pp. S310-S318 (1985).
Larsson, B., et al., Nature 182, 1222 (1958).
Lawrence, J.H., Cancer 10, 795 (1957).
Lawrence, J.H., et al., "Heavy particles in acromegaly and Cushing's Disease," in Endocrine and Norendocrine Hormone Producing Tumors (Year Book Medical Chicago, 1973), pp. 29-61.
Lawrence, J.H., et al., "Successful Treatment of Acromegaly: Metabolic and Clinical Studies in 145 Patients", The Journal of Clinical Endrocrinology and Metabolism, vol. 31, No. 2, Aug. 1970.
Lawrence, J.H., et al., Treatment of Pituitary Tumors, (Excerpta medica, Amsterdam/American Elsevier, New York, 1973), pp. 253-262.
Lecroy, W., et al., "Viewing Probe for High Voltage Pulses", *Review of Scientific Instruments USA* 31(12), p. 1354 (Dec. 1960).
Linfoot, J.A., et al., "Acromegaly," in Hormonal Proteins and Peptides, edited by C.H. Li, (1975), pp. 191-246.
Literature Author and Keyword Search, Feb. 14, 2005 (44 pages).
Literature Author and Keyword Searches (Synchrotron), Jan. 25, 2005 (78 pages).
Literature Keyword Search, Jan. 24, 2005 (96 pages).
Literature Search, Jan. 26, 2005 (36 pages).
Literature Search and Keyword Search for Synchrocyclotron, Jan. 25, 2005 (68 pages).
Literature Search by Company Name/Component Source, Jan. 24, 2005 (111 pages).
"LLNL, UC Davis Team Up to Fight Cancer", Lawrence Livermore National Laboratory, Apr. 28, 2006, SF-06-04-02, Livermore, California, pp. 1-4.
Mandrillon, P. "High Energy Medical Accelerators" *EPAC 90, 2nd European Particle Accelerator Conference*, vol. 2, (Jun. 12-16, 1990), pp. 54-58.
Marti, F., et al., "High Intensity Operation of a Superconducting Cyclotron", *Proceedings of the 14the International Conference, Cyclotrons and Their Applications*, pp. 45-48 (Oct. 1995).
Martin, P. "Operational Experience with Superconducting Synchrotron Magnets" *Proceedings of the 1987 IEEE Particle Accelerator Conference*, vol. 3 of 3, pp. 1379-1382 (Mar. 16-19, 1987).
Meot, F., et. al. "ETOILE Hadrontherapy Project, Review of Design Studies" *Proceedings of EPAC 2002*, pp. 2745-2747 (2002).
Miyamoto, S., et. al. "Development of the Proton Therapy System" *The Hitachi Hyoron*, vol. 79, 10, pp. 775-779 (1997) [Lang: Japanese], English abstract (http://www.hitachi.com/rev/1998/revfeb98/rev4706.htm).
Montelius, A., et. al. "The Narrow Proton Beam Therapy Unit at the Svedberg Laboratory in Uppsala" *ACTA Oncologica*, vol. 30, pp. 739-745 (1991).
Moser, H.O., et al., "Nonlinear Beam Optics with Real Fields in Compact Storage Rings", Nuclear Instruments & Methods in Physics Research/Section B, B30, Feb. 1988, No. 1, pp. 105-109.
National Cancer Institute Funding (Senate—Sep. 21, 1992) (www.thomas.loc.gov/cgi-bin/query/z?r102:S21SE2-712 (2 pages).
Nicholson, J. "Applications of Proton Beam Therapy" *Journal of the American Society of Radiologic Technologists*, vol. 67, No. 5, pp. 439-441 (May/Jun. 1996).
Nolen, J.A., et al., "The Integrated Cryogenic—Superconducting Beam Transport System Planned for MSU", *Proceedings of the 12th International Conference on High-Energy Accelerators*, pp. 549-551 (Aug. 1983).
Norimine, T., et. al. "A Design of a Rotating Gantry with Easy Steering for Proton Therapy" *Proceedings of EPAC 2002*, pp. 2751-2753 (2002).
Okumura, T., et. al. "Overview and Future Prospect of Proton Radiotherapy" *Japanese Journal of Cancer Clinics*, vol. 43, No. 2, pp. 209-214 (1997) [Lang.: Japanese].
Okumura, T., et. al. "Proton Radiotherapy" *Japanese Journal of Cancer and Chemotherapy*, 10. 20, No. 14, pp. 2149-2155 (1993) [Lang.: Japanese].
Outstanding from Search Reports, "Accelerator of Polarized Portons at Fermilab," 20 pages, 2005.
Palmer, R. and Tollestrup, A. V. "Superconducting Magnet Technology for Accelerators" *Annual Review of Nuclear and Particle Science*, vol. 34, pp. 247-284 (1984).
Patent Assignee and Keyword Searches for Synchrocyclotron, Jan. 25, 2005 (77 pages).
"Patent Assignee Search Paul Scherrer Institute," Library Services at Fish & Richardson P.C., Mar. 20, 2007 (40 pages).
"Patent Prior Art Search for 'Proton Therapy System'," Library Services at Fish & Richardson P.C., Mar. 20, 2007 (46 pages).
Pavlovic, M. "Beam-optics study of the gantry beam delivery system for light-ion cancer therapy" *Nuclear Instruments and Methods in Physics Research*, Section A, vol. 399, No. 2, pp. 439-454(16) (Nov. 1997).
Pedroni, E. "Accelerators for Charged Particle Therapy: Performance Criteria from the User Point of View" *Cyclotrons and their Applications, Proceedings of the 13th International Conference*, pp. 226-233 (Jul. 6-10, 1992).
Pedroni, E. "Latest Developments in Proton Therapy" *Proceedings of EPAC* 2000, pp. 240-244 (2000).
Pedroni, E., et. al. "The 200-MeV proton therapy project at the Paul Scherrer Institute: Conceptual design and practical realization" *Medical Physics*, vol. 22, No. 1, pp. 37-53 (Jan. 1995).
Pedroni, E., et. al. "A Novel Gantry for Proton Therapy at the Paul Scherrer Institute" *Cycloctrons and Their Applications 2001: Sixteenth International Conference. AIP Conference Proceedings*, vol. 600, pp. 13-17 (2001).
Pedroni, E. and Enge, H. "Beam optics design of compact gantry for proton therapy" *Medical & Biological Engineering & Computing*, vol. 33, No. 3, pp. 271-277 (May 1995).
Pedroni, E. and Jermann, M. "SGSMP: Bulletin Mar. 2002 PROSCANProject, Progress Report on the Proscan Project of PSI" [online] retrieved from www.sgsmp.ch/protA23.htm, (5 pages) Mar. 2002.
Potts, R., et. al. "MPWP6-Therapy III: Treatment Aids and Techniques" *Medical Physics*, vol. 15, No. 5, p. 798 (Sep./Oct. 1988).
Pourrahimi, S. et al., "Powder Metallurgy Processed Nb3Sn(Ta) Wire for High Field NMR magnets," IEEE Transactions on Applied Superconductivity, vol. 5, No. 2, (Jun. 1995), pp. 1603-1606.
Prieels, D., et. al. "The IBA State-of-the-Art Proton Therapy System, Performances and Recent Results" *Application of Accelerators in Research and industry—Sixteenth Int'l. Conf., American Institute of Physics*, vol. 576, pp. 857-860 (Nov. 1-5, 2000).

(56) References Cited

OTHER PUBLICATIONS

Rabin, M. S. Z., et. al. "Compact Designs for Comprehensive Proton Beam Clinical Facilities" *Nuclear Instruments & Methods in Physics Research*, Section B, vol. 40-41, Part II, pp. 1335-1339 (Apr. 1989).
Research & Development Magazine, "Proton Therapy Center Nearing Completion", vol. 41, No. 9, Aug. 1999 (2 pages)(www.rdmag.com).
RetroSearch "Berkeley 88-Inch Cyclotron 'RF' or 'Frequency Control'," Jan. 21, 2005 (36 pages).
RetroSearch "Berkeley 88-Inch Cyclotron," Jan. 24, 2005 (170 pages).
RetroSearch "Bernard Gottschalk, Cyclotron, Beams, Compensated Upstream Modulator, Compensated Scatter," Jan. 21, 2005 (20 pages).
RetroSearch "Cyclotron with 'RF' or 'Frequency Control'," Jan. 21, 2005 (49 pages).
RetroSearch Gottschalk, Bernard, Harvard Cyclotron Wheel, Jan. 21, 2005 (20 pages).
RetroSearch "Loma Linda University, Beam Compensation Foil Wedge," Jan. 21, 2005 (15 pages).
RetroSearch "Loma Linda University Beam Compensation," Jan. 21, 2005 (60 pages).
Revised Patent Keyword Search, Jan. 25, 2005 (88 pages).
Rifuggiato, D., et. al. "Status Report of the LNS Superconducting Cyclotron" *Nukleonika*, vol. 48, pp. S131-S134 (Supplement 2, 2003).
Rode, C. H. "Tevatron Cryogenic System" *Proceedings of the 12th International Conference on High-energy Accelerators, Fermilab*, pp. 529-535 (Aug. 11-16, 1983).
Schillo, M., et. al. "Compact Superconducting 250 MeV Proton Cyclotron for the PSI Proscan Proton Therapy Project" *Cyclotrons and Their Applications 2001, Sixteenth International Conference*, pp. 37-39 (2001).
Schneider et al., "Superconducting Cyclotrons," IEEE Transactions on Magnetics, vol. MAG-11, No. 2, Mar. 1975, New York, pp. 443-446.
Schneider, R., et al., "Nevis Synchrocyclotron Conversion Program—RF System," *IEEE Transactions on Nuclear Science USA ns 16*(3) pp. 430-433 (Jun. 1969).
Schreuder, H.W. "Recent Developments in Superconducting Cyclotrons" *Proceedings of the 1995 Particle Accelerator Conference*, vol. 1, pp. 317-321 (May 1-5, 1995).
Schreuder, A. N., et. al. "The Non-orthogonal Fixed Beam Arrangement for the Second Proton Therapy Facility at the National Accelerator Centre" *Application of Accelerators in Research and Industry, American Institute of Physics, Proceedings of the Fifteenth International Conference*, Part Two, pp. 963-966 (Nov. 1998).
Schubert, J. R. "Extending the Feasibility Boundary of the Isochronous Cyclotron" Dissertation submitted to Michigan State University, 1997, Abstract http://adsabs.harvard.edu/abs/1998PhDT..... 147S.
Schubert, J. and Blosser, H. "Conceptual Design of a High Field Ultra-Compact Cyclotron for Nuclear Physics Research" *Proceedings of the 1997 Particle Accelerator Conference*, vol. 1, pp. 1060-1062 (May 12-16, 1997).
Shelaev, I. A., et. al. "Design Features of a Model Superconducting Synchrotron of JINR" *Proceedings of the 12th International Conference on High-energy Accelerators*, pp. 416-418 (Aug. 11-16, 1983).
Shintomi, T., et. al. "Technology and Materials for the Superconducting Super Collider (SSC) Project" [Lang.: Japanese], The Iron and Steel Institute of Japan 00211575, vol. 78, No. 8 (19920801), pp. 1305-1313, http://ci.nii.ac.jp/naid/110001493249/en/ , 1992.
Sisterson, J. M. "World Wide Proton Therapy Experience in 1997" *The American Insitute of Physics, Applications of Accelerators in Research and Industry, Proceedings of the Fifteenth International Conference*, Part Two, pp. 959-962 (Nov. 1998).
Sisterson, J. M. "Clinical Use of Proton and Ion Beams From a World-Wide Perspective" *Nuclear Instruments and Methods in Physics Research*, Section B, vols. 40-41, pp. 1350-1353 (1989).
Slater, J. M., et. al. "Development of a Hospital-Based Proton Beam Treatment Center" *International Journal of Radiation Oncology Biology Physics*, vol. 14, No. 4, pp. 761-775 (Apr. 1988).
Slater, J. M., et. al. "Developing a Clinical Proton Accelerator Facility: Consortium-Assisted Technology Transfer" *Conference Record of the 1991 IEEE Particle Accelerator Conference: Accelerator Science and Technology*, vol. 1, pp. 532-536 (May 6-9, 1991).
Smith, A., et. al. "The Northeast Proton Therapy Center at Massachusetts General Hospital" *Journal of Brachytherapy International*, pp. 137-139 (Jan. 1997).
Snyder, S. L. and Marti, F. "Central region design studies for a proposed 250 MeV proton cyclotron" *Nuclear Instruments and Methods in Physics Research*, Section A, vol. 355, pp. 618-623 (1995).
Soga, F. "Progress of Particle Therapy in Japan" *Application of Accelerators in Research and Industry, American Institute of Physics, Sixteenth International Conference*, pp. 869-872 (Nov. 2000).
Spiller, P., et. al. "The GSI Synchrotron Facility Proposal for Acceleration of High Intensity Ion and Proton Beams" *Proceedings of the 2003 Particle Accelerator Conference*, vol. 1, pp. 589-591 (May 12-16, 2003).
Stanford, A.L., et al., "Method of Temperature Control in Microwave Ferroelectric Measurements," Sperry Microwave Electronics Company, Clearwater, Florida, Sep. 19, 196 (1 page), 2013.
Superconducting Cyclotron Contract awarded by Paul Scherrer Institute (PSI), Villigen, Switzerland, http://www.accel.de/News/superconducting_cyclotron_contract.html Feb. 3, 2005.
Tadashi, I., et al., "Large superconducting super collider (SSC) in the planning and materials technology", vol. 78, No. 8 (Aug. 1, 1992), pp. 1305-1313, The Iron and Steel Institute of Japan 00211575.
Takada, Yoshihisa Tsukumba, "A review of rotating gantries for heavy charged particle therapy," Symposium of Research Center for Charged Particle Therapy on Fundamental development of the charged particle therapy, Chiba (Japan), Nov. 13-14, 2001.
Takada, Y. "Conceptual Design of a Proton Rotating Gantry for Cancer Therapy" *Japanese Journal of Medical Physics*, vol. 15, No. 4, pp. 270-284 (1995).
Takayama, T., et al., "Compact Cyclotron for Proton Therapy," *Proceedings of the 8th Symposium on Accelerator Science and Technology*, Japan (Nov. 25-27, 1991) pp. 380-382.
Teng, L. C. "The Fermilab Tevatron" *Coral Gables 1981, Proceedings, Gauge Theories, Massive Neutrinos, and Proton Decay*, pp. 43-62 (1981).
"The Davis 76-Inch Isochronous Cyclotron", Beam On: Crocker Nuclear Laboratory, University of California, 2013.
The Journal of Practical Pharmacy, vol. 46, No. 1, 1995, pp. 97-103. [Japanese].
"The K100 Neutron-therapy Cyclotron," National Superconducting Cyclotron Laboratory at Michigan State University (NSCL), retrieved from: http://www.nscl.msu.edu/tech/accelerators/k100 , Feb. 2005.
"The K250 Proton therapy Cyclotron," National Superconducting Cyclotron Laboratory at Michigan State University (NSCL), retrieved from: http://www.nscl.msu.edu/tech/accelerators/k250.html , Feb. 2005.
"The K250 Proton-therapy Cyclotron Photo Illustration," National Superconducting Cyclotron Laboratory at Michigan State University (NSCL), retrieved from: http://www.nscl.msu.edu/media/image/experimental-equipment-technology/250.html , Feb. 2005.
Tobias, C.A., et al., Cancer Research 18, 121 (1958).
Tom, J. L. "The Use of Compact Cyclotrons for Producing Fast Neutrons for Therapy in a Rotatable Isocentric Gantry" *IEEE Transaction on Nuclear Science*, vol. 26, No. 2, pp. 2294-2298 (Apr. 1979).
Toyoda, E., "Proton Therapy System", Sumitomo Heavy Industries, Ltd., 2013.
Trinks, U., et. al. "The Tritron: A Superconducting Separated-Orbit Cyclotron" *Nuclear Instruments and Methods in Physics Research*, Section A, vol. 244, pp. 273-282 (1986).

(56) References Cited

OTHER PUBLICATIONS

Tsuji, H., "Cancer Therapy by Proton Beam: Latest State and Future Prospects", *Isotope News*, No. 459, pp. 2-7 (1992).
Tsuji, H. "The Future and Progress of Proton Beam Radiotherapy" *Journal of Japanese Society for Therapeutic Radiology and Oncology*, vol. 6, No. 2, pp. 63-76 (1994).
UC Davis School of Medicine, "Unlikely Partners Turn Military Defense into Cancer Offense", Current Issue Summer 2008, Sacramento, California, pp. 1-2.
Umegaki, K., et. al. "Development of an Advanced Proton Beam Therapy System for Cancer Treatment" *Hitachi Hyoron*, vol. 85, No. 9, pp. 605-608 (2003) [Lang.: Japanese], English abstract, http://www.hitachi.com/ICSFiles/afieldfile/2004/06/01/r2003_04_104.pdf or http://www.hitachi.com/rev/archive/2003/2005649_12606.html (full text) [Hitachi, vol. 52, No. 4 Dec. 2003].
Umezawa, M., et. al. "Beam Commissioning of the new Proton Therapy System for University of Tsukuba" *Proceedings of the 2001 Particle Accelerator Conference*, vol. 1, pp. 648-650 (Jun. 18-22, 2001).
van Steenbergen, A. "The CMS, a Cold Magnet Synchrotron to Upgrade the Proton Energy Range of the BNL Facility" *IEEE Transactions on Nuclear Science*, vol. 18, Issue 3, pp. 694-698 (Jun. 1971).
van Steenbergen, A. "Superconducting Synchroton Development at BNL" *Proceedings of the 8th International Conference on High-Energy Accelerators CERN 1971*, pp. 196-198 (1971).
Vandeplassche, D., et. al. "235 MeV Cyclotron for MGH's North-east Proton Therapy Center (NPTC): Present Status" EPAC 96, *Fifth European Partical Accelerator Conference*, vol. 3, pp. 2650-2652 (Jun. 10-14, 1996).
Vorobiev, L.G., et al., "Concepts of a Compact Achromatic Proton Gantry with a Wide Scanning Field", Nuclear Instruments and Methods in Physics Research, Section A., vol. 406, No. 2, pp. 307-310 (1998).
Vrenken, H., et. al. "A Design of a Compact Gantry for Proton Therapy with 2D-Scanning" *Nuclear Instruments and Methods in Physics Research*, Section A, vol. 426, No. 2, pp. 618-624 (1999).
Wikipedia, "Cyclotron" http://en.wikipedia.org/wiki/Cyclotron (originally visited Oct. 6, 2005, revisited Jan. 28, 2009)(7 pages).
Wikipedia, "Synchrotron" http://en.wikipedia.org/wiki/Synchrotron (originally visited Oct. 6, 2005, revisited Jan. 28, 2009)(7pages).
Worldwide Patent Assignee Search, Jan. 24, 2005 (224 pages).
Worldwide Patent Keyword Search, Jan. 24, 2005 (94 pages).
Wu, X., "Conceptual Design and Orbit Dynamics in a 250 MeV Superconducting Synchrocyclotron," Ph.D. Dissertation, Michigan State University, Department of Physics and Astronomy (1990).
York, R.C., et al., "Present Status and Future Possibilities at NSCL-MSU", EPAC 94, Fourth European Particle Accelerator Conference, pp. 554-556 (Jun. 1994).
York, R.C., et al., "The NSCL Coupled Cyclotron Project—Overview and Status", *Proceedings of the Fifteenth International Conference on Cyclotrons and their Applications*, pp. 687-691 (Jun. 1998).
Yudelev, M., et. al. "Hospital Based Superconducting Cyclotron for Neutron Therapy: Medical Physics Perspective" *Cyclotrons and their applications 2001, 16th International Conference. American Institute of Physics Conference Proceedings*, vol. 600, pp. 40-43 (May 13-17, 2001) http://www.osti.gov/energycitations/product.biblio.jsp?osti_id=20468164 http://adsabs.harvard.edu/abs/2001AIPC..600...40Y http://scitation.aip.org/getabs/servlet/GetabsServlet?prog=normal&id=APCP-CS000600000001000040000001&idtype=cvips&gifs=yes.
Zherbin, E. A., et al., "Proton Beam Therapy at the Leningrad Synchrocyclotron (Clinicomethodological Aspects and Therapeutic Results)", pp. 17-22, Aug. 1987, vol. 32(8)(German with English abstract on pp. 21-22).
18th Japan Conference on Radiation and Radioisotopes [Japanese], Nov. 25-27, 1987, 9 pages.
"510(k) Summary: Ion Beam Applications S.A.", FDA, Apr. 13, 2001.
"510(k) Summary: Optivus Proton Beam Therapy System", Jul. 21, 2000, 5 pages.
U.S. Appl. No. 11/601,056, filed Nov. 17, 2006.
Flanz, et al., "Operation of a Cyclotron Based Proton Therapy Facility", Massachusetts General Hospital, Boston, MA 02114, pp. 1-4, 2013.
Resmini, F., "Design Characteristics of the K=800 Superconducting Cyclotron at M.S.U.", Cyclotron Laboratory, Michigan State University, East Lansing, Michigan 48824, IEEE Transaction on Nuclear Science, vol. NS-26, No. 2, Apr. 1979 (8 pages).
European Search Report from application No. EP 06838033.6 (PCT/US2006/044853) mailed May 11, 2009 (69 pages).
European Patent Office communication for application No. 06838033.6, patent No. 1949404, mailed Aug. 5, 2009 (1 page).
Invitation to Pay Additional Fees and, where applicable, Protest Fees with partial search report for application No. PCT/US2008/077513 mailed Jul. 3, 2009 (62 pages).
Office action and response history of U.S. Appl. No. 11/601,056 to Aug. 24, 2009.
International Search Report and Written Opinion mailed Oct. 1, 2009 in PCT application No. PCT/US2008/077513 (73 pages).
International Preliminary Report on Patentability from PCT application No. PCT/US2008/084695, mailed Jun. 10, 2010 (10 pages).
International Preliminary Report on Patentability from PCT application No. PCT/US2008/084699, mailed Jun. 10, 2010 (8 pages).
International Preliminary Report on Patentability from PCT application No. PCT/US2007/086109, mailed Jun. 10, 2010 (7 pages).
European Patent Office communication from European application No. 07868958.5, mailed Jul. 16, 2010 (2 pages).
Voluntary amendment filed Apr. 18, 2011 in corresponding Chinese application No. CN200780102281.X , including English translation of claim amendments (10 pages).
Non Final Office Action from U.S. Appl. No. 12/618,297 mailed May 13, 2011 (44 pages).
Response to Office Action issued Aug. 20, 2010 in U.S. Appl. No. 11/948,359, filed Feb. 22, 2011 (17 pages).
Non Final Office Action from U.S. Appl. No. 11/948,359 mailed Aug. 20, 2010 (12 pages).
Non Final Office Action from U.S. Appl. No. 12/275,103 mailed Feb. 1, 2011 (6 pages).
Response to Non Final Office Action issued Feb. 1, 2011 in U.S. Appl. No. 12/275,103, filed May 2, 2011 (13 pages).
European Search Report from corresponding European application No. 11165422.4 mailed Aug. 8, 2011 (118 pages).
European Search Report from corresponding European application No. 11165423.2 mailed Aug. 8, 2011 (118 pages).
European Communication from corresponding European application No. 11165422.4 mailed Sep. 2, 2011 (5 pages).
European Communication from corresponding European application No. 11165423.2 mailed Sep. 2, 2011 (5 pages).
Chinese Office action from Chinese application No. 200680051421.0 issued Aug. 22, 2011 (4 pages).
Chinese Office action from Chinese application No. 200680051421.0 issued Mar. 21, 2011 (6 pages).
Chinese Office action from Chinese application No. 200680051421.0 issued Dec. 25, 2009 (8 pages).
Canadian Office action from Canadian application No. 2,629,333 issued May 11, 2011 (2 pages).
Canadian Office action from Canadian application No. 2,629,333 issued Aug. 30, 2010 (5 pages).
European Communication from European application No. 06838033.6 mailed Apr. 20, 2010 (7 pages).
European Patent Office communication from European application No. 08855024.9, mailed Jul. 30, 2010 (2 pages).
European Patent Office communication from European application No. 08856764.9, mailed Jul. 30, 2010 (2 pages).
Chinese Office action from Chinese application No. 200880125918.1, mailed Sep. 15, 2011 (111 pages).
Chinese Office action from Chinese application No. 200880125832.9, mailed Sep. 22, 2011 (11 pages).
Response to Chinese Office action of Jan. 25, 2010 in Chinese application No. 200680051421.0, filed Jun. 24, 2010 (34 pages).

(56) References Cited

OTHER PUBLICATIONS

Office action from U.S. Appl. No. 11/948,359, mailed Aug. 20, 2010 (12 pages).
Response to European Communication of Apr. 20, 2010, from European application No. 06838033.6, filed Nov. 2, 2010 (13 pages).
European Communication from European application No. 07868958.5, mailed Nov. 26, 2010 (50 pages).
Response to European Communication of Jul. 16, 2010 in European application No. 07868958.5 filed Aug. 26, 2010 (9 pages).
Response to European Communication of Nov. 26, 2010 in European application No. 07868958.5, filed Mar. 28, 2011 (9 pages).
Schubert and Blosser, "Progress Toward an Experiment to Study the Effect of RF Grounding in an Internal Ion Source on Axial Oscillations of the Beam in a Cyclotron", National Superconducting Cyclotron Laboratory, Michigan State University, Report MSUCL-760, CP600, Cyclotrons and Their Applications 2001, Sixteenth International Conference, 2001 pp. 274-276.
Cuttone, G., "Applications of a Particle Accelerators in Medical Physics" Istituto Nazionale di Fisica Nucleare-Laboratori Nazionali del Sud, V.S. Sofia, 44 Cantania, Italy, Jan. 2010 (17 pages).
Source Search Cites of U.S. and Foreign Patents/Published applications in the name of Mitsubishi Denki Kabushiki Kaisha and Containing the Keywords (Proton and Synchrocyclotron), Jan. 2005, 8 pages.
Flanz, et al., "Operation of a Cyclotron Based Proton Therapy Facility", Massachusetts General Hospital, Boston, MA, 2010, pp. 1-4.
Krevet, et al, "Design of a Strongly Curved Superconducting Bending Magnet for a Compact Synchrotron Light Source", Advances in Cryogenic Engineering, vol. 33, pp. 25-32, 1988.
Stanford, A.L., et al., "Method of Temperature Control in Microwave Ferroelectric Measurements," Sperry Microwave Electronics Company, Clearwater, Florida, Sep. 19, 1960 (1 page).
Tadashi, I., et al., "Large superconducting super collider (SSC) in the planning and materials technology", vol. 78, No. 8 (Aug. 1992), pp. 1305-1313, The Iron and Steel Institute of Japan 00211575.
"The Davis 76-Inch Isochronous Cyclotron", Beam On: Crocker Nuclear Laboratory, University of California, Feb. 9, 2009 (1 page).
Badano et al., Proton-Ion Medical Machine Study (PIMMS) Part I, PIMMS, Jan. 1999, 238 pages.
"Beam Delivery and Properties" Journal of the ICRU, vol. 7 No. 2, 2007, 20 pages.
Peggs et al. "A Survey of Hadron Therapy Accelerator Technologies" Particle Accelerator Conference, Jun. 25-29, 2007, 7 pages.
Pedroni et al., "Latest Developments in Proton Therapy" Proceedings of EPAC, Vienna Austria, 2000, 5 pages.
Collins, et al., "The Indiana University Proton Therapy System", Proceedings of EPAC 2006, Edinburgh, Scotland, 3 pages.
Paganetti et al., "Proton Beam Radiotherapy—The State of the Art" Springer Verlag, Heidelberg, ISBN 3-540-00321-5, Oct. 2005, 36 pages.
Pedroni, "Status of Proton Therapy: results and future trends" Paul Scherrer Institute, Division of Radiation Medicine, 5 pages, 2013.
Kimstrand, "Beam Modelling for Treatment Planning of Scanned Proton Beams" Digital Comprehensive Summaries of Uppsala dissertations from the Faculty of Medicine 330, Uppsala Universitet, 2008, 58 pages.
Marchand et al., "IBA Proton Pencil Beam Scanning: an Innovative Solution for Cancer Treatement", Proceedings of EPAC 2000, Vienna, Austria, 3 pages.
Alonso, "Magnetically Scanned Ion Beams for Radiation Therapy" Accelerator & Fusion Research Division, Lawrence Berkeley Laboratory, Berkeley, CA, Oct. 1988, 13 pages.
Moyers et al., "A Continuously Variable Thickness Scatterer for Proton Beams Using Self-compensating Dual Linear Wedges" Loma Linda University Medical Center, Dept. of Radiation Medicine, Loma Linda, CA, Nov. 2, 1992, 21 pages.
Chu et al., "Performance Specifications for Proton Medical Facility", Lawrence Berkeley Laboratory, University of California, Mar. 1993, 128 pages.
Chu, "Instrumentation in Medical Systems" Accelerator and Fusion Research Division, Lawrence Berkeley Laboratory, University of California, Berkeley, CA, May 1995, 9 pages.
Tilly et al., "Development and verification of the pulsed scanned proton beam at The Svedberg Laboratory in Uppsala", Phys. Med. Biol. 52, 2007, pp. 2741-2754.
Bimbot, "First Studies of the Extenral Beam from the Orsay S.C. 200 MeV" Institut de Physique Nucleaire, BP 1, Orsay, France, IEEE, 1979, pp. 1923-1926.
Cosgrove et al., "Microdosimetric Studies on the Orsay Proton Synchrocyclotron at 73 and 200 MeV", Radiation Protection Dosimetry, vol. 70, Nos. 1-4, pp. 493-496, 1997.
Laisne et al., "The Orsay 200 MeV Synchrocyclotron" IEEE Transactions on Nuclear Science, vol. NS-26, No. 2, Apr. 1979, pp. 1919-1922.
Lin et al., "Principles and 10 year experience of the beam monitor system at the psi scanned proton therapy facility" Center for Proton Radiation Therapy, Paul Scherrer Institute, Switzerland, 21 pages, 2013.
Chinese Office Action for Chinese application 200880125918.1 mailed Sep. 15, 2011 (15pages).
Response to Chinese Office Action mailed Sep. 15, 2011 in Chinese application 200880125918.1, filed Mar. 29, 2012 (26 pages).
Chinese Office Action for Chinese application 200880125918.1 mailed May 30, 2012 (10 pages).
Response to Chinese Office Action mailed May 30, 2012 in Chinese application 200880125918.1, filed Aug. 14, 2012 (19 pages).
Chinese Office Action for Chinese application 200880125918.1 mailed Dec. 7, 2012 (10 pages).
Japanese Office action with English translation from corresponding Japanese application No. 2010-536130 issued Jun. 4, 2013 (8 pages).
Timmer, Jan, "The ACCEL Single Room Proton Therapy Facility" ACCEL Instruments GmbH, PTCOG 45, Oct. 7-11, 2006, Houston, Texas (18 pages).
Renner, T.R., et al., "Preliminary Results of a Raster Scanning Beam Delivery System", IEEE, 1989 (3 pages).
Pardo, J., et al., "Simulation of the Performance of the CNAO facility's Beam Delivery System", PTCOG 46, Zibo, China, May 21, 2007 (17 pages).
"Single Room Proton Therapy Facility", ACCEL, Oct. 2006 (1 page).
Flanz, J, et al., "Scanning Beam Technologies", PTCOG 2008 (28 pages).
Lin, S., et al., "Principles and 10 Year Experience of the Beam Monitor System at the PSI Scanned Proton Therapy Facility", Center for Proton Radiation Therapy, Paul Scherrer Institute, CH-5232 Villigen PSI, Switzerland, 2007 (21 pages).
Tilly, et al., "Development and verification of the pulsed scanned proton beam at The Svedberg Laboratory in Uppsala", Physics in Medicine and Biology, Phys. Med. Biol. 52, pp. 2741-2454, 2007.
Response with English translation to Japanese Office action mailed Feb. 10, 2014 from corresponding Japanese application No. 2010-536130, filed May 8, 2014 (15 pages).
Japanese Office Action with English translation from corresponding Japanese application No. 2010-536130 issued on Feb. 10, 2014 (9 pages).
International Search Report and Written Opinion from corresponding PCT application No. PCT/US2008/084695 mailed on Jan. 26, 2009 (13 pages).
European Search Report from corresponding European application 08855024.9 dated Jun. 6, 2014 (5 pages).
European Communication from corresponding European application 08855024.9 dated Jul. 29, 2014 (10 pages).
Kleeven, W., "Injection and Extraction for Cyclotrons", Ion Beam Applications (IBA), Proceedings of the Specialised CERN Accelerator School on Small Accelerators, Oct. 26, 2006, pp. 271-296, XP055119328, Geneva, Switzerland, Retrieved from the Internet: URL:http://cds.cern.ch/record/1005057/files/p271.pdf, [retrieved on May 21, 2014].

(56) References Cited

OTHER PUBLICATIONS

YamayaA, T., et al.: "A Small Cold Cathode Heavy Ion Source for a Compact Cyclotron", Nuclear Instruments and Methods in Physics Research, vol. 226, Jan. 1, 1984, pp. 219-222, XP055119506.
Welton, R. F., "RF-Plasma Coupling Schemes for the SNS Ion Source", AIP Conference Proceedings, vol. 694, Jan. 1, 2003, pp. 431-438, XP055119965.
Taiwanese Office Action with English translation from corresponding Taiwanese application 097144549 dated Sep. 4, 2014 (20 pages).

* cited by examiner

INTERRUPTED PARTICLE SOURCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This [patent] application *a reissue application of U.S. application Ser. No. 14/075,261 filed on Nov. 8, 2013 now U.S. Pat. No. 8,970,137, which* is a continuation of U.S. application Ser. No. 11/948,662, which was filed on Nov. 30, 2007 [and which is scheduled to issue as] *now* U.S. Pat. No. 8,581,523 [on Nov. 12, 2013]. The contents of U.S. application Ser. No. 11/948,662 are incorporated herein by reference.

TECHNICAL FIELD

This patent application describes a particle accelerator having a particle source that is interrupted at an acceleration region.

BACKGROUND

In order to accelerate charged particles to high energies, many types of particle accelerators have been developed. One type of particle accelerator is a cyclotron. A cyclotron accelerates charged particles in an axial magnetic field by applying an alternating voltage to one or more dees in a vacuum chamber. The name dee is descriptive of the shape of the electrodes in early cyclotrons, although they may not resemble the letter D in some cyclotrons. The spiral path produced by the accelerating particles is perpendicular to the magnetic field. As the particles spiral out, an accelerating electric field is applied at the gap between the dees. The radio frequency (RF) voltage creates an alternating electric field across the gap between the dees. The RF voltage, and thus the field, is synchronized to the orbital period of the charged particles in the magnetic field so that the particles are accelerated by the radio frequency waveform as they repeatedly cross the gap. The energy of the particles increases to an energy level greatly in excess of the peak voltage of the applied RF voltage. As the charged particles accelerate, their masses grow due to relativistic effects. Consequently, the acceleration of the particles varies the phase match at the gap.

Two types of cyclotrons presently employed, an isochronous cyclotron and a synchrocyclotron, overcome the challenge of increase in relativistic mass of the accelerated particles in different ways. The isochronous cyclotron uses a constant frequency of the voltage with a magnetic field that increases with radius to maintain proper acceleration. The synchrocyclotron uses a decreasing magnetic field with increasing radius to provide axial focusing and varies the frequency of the accelerating voltage to match the mass increase caused by the relativistic velocity of the charged particles.

SUMMARY

In general, this patent application describes a synchrocyclotron comprising magnetic structures to provide a magnetic field to a cavity, and a particle source to provide a plasma column to the cavity. The particle source has a housing to hold the plasma column. The housing is interrupted at an acceleration region to expose the plasma column. A voltage source is configured to provide a radio frequency (RF) voltage to the cavity to accelerate particles from the plasma column at the acceleration region. The synchrocyclotron described above may include one or more of the following features, either alone or in combination.

The magnetic field may be above 2 Tesla (T), and the particles may accelerate from the plasma column outwardly in spirals with radii that progressively increase. The housing may comprise two portions that are completely separated at the acceleration region to expose the plasma column. The voltage source may comprise a first dee that is electrically connected to an alternating voltage and a second dee that is electrically connected to ground. At least part of the particle source may pass through the second dee. The synchrocyclotron may comprise a stop in the acceleration region. The stop may be for blocking acceleration of at least some of the particles from the plasma column. The stop may be substantially orthogonal to the acceleration region and may be configured to block certain phases of particles from the plasma column.

The synchrocyclotron may comprise cathodes for use in generating the plasma column. The cathodes may be operable to pulse a voltage to ionize gas to generate the plasma column. The cathodes may be configured to pulse at voltages between about 1 kV to about 4 kV. The cathodes need not be heated by an external heat source. The synchrocyclotron may comprise a circuit to couple voltage from the RF voltage to the at least one of the cathodes. The circuit may comprise a capacitive circuit.

The magnetic structures may comprise magnetic yokes. The voltage source may comprise a first dee that is electrically connected to an alternating voltage and a second dee that is electrically connected to ground. The first dee and the second dee may form a tunable resonant circuit. The cavity to which the magnetic field is applied may comprise a resonant cavity containing the tunable resonant circuit.

In general, this patent application also describes a particle accelerator comprising a tube containing a gas, a first cathode adjacent to a first end of the tube, and a second cathode adjacent to a second end of the tube. The first and second cathodes are for applying voltage to the tube to form a plasma column from the gas. Particles are available to be drawn from the plasma column for acceleration. A circuit is configured to couple energy from an external radio frequency (RF) field to at least one of the cathodes. The particle accelerator described above may include one or more of the following features, either alone or in combination.

The tube may be interrupted at an acceleration region at which the particles are drawn from the plasma column. The first cathode and the second cathode need not be heated by an external source. The first cathode may be on a different side of the acceleration region than the second cathode.

The particle accelerator may comprise a voltage source to provide the RF field. The RF field may be for accelerating the particles from the plasma column at the acceleration region. The energy may comprise a portion of the RF field provided by the voltage source. The circuit may comprise a capacitor to couple energy from the external field to at least one of the first cathode and the second cathode.

The tube may comprise a first portion and a second portion that are completely separated at a point of interruption at the acceleration region. The particle accelerator may comprise a stop at the acceleration region. The stop may be used to block at least one phase of the particles from further acceleration.

The particle accelerator may comprise a voltage source to provide the RF field to the plasma column. The RF field may be for accelerating the particles from the plasma column at the acceleration region. The RF field may comprise a voltage that is less than 15 kV. Magnetic yokes may be used to provide a magnetic field that crosses the acceleration region. The magnetic field may be greater than about 2 Tesla (T).

In general, this patent application also describes a particle accelerator comprising a Penning ion gauge (PIG) source comprising a first tube portion and a second tube portion that are at least partially separated at an acceleration region. The first tube portion and the second tube portion are for holding a plasma column that extends across the acceleration region. A voltage source is used to provide a voltage at the acceleration region. The voltage is for accelerating particles out of the plasma column at the acceleration region. The particle accelerator described above may include one or more of the following features, either alone or in combination.

The first tube portion and the second tube portion may be completely separated from each other. Alternatively, only one or more portions of the first tube portion may be separated from corresponding portions of the second tube portion. In this latter configuration, the PIG source may comprise a physical connection between a part of the first tube portion and the second tube portion. The physical connection may enable particles accelerating out of the plasma column to complete a first turn upon escaping from the plasma column without running into the physical connection.

The PIG source may pass through a first dee that is electrically connected to ground. A second dee that is electrically connected to an alternating voltage source may provide the voltage at the acceleration region.

The particle accelerator may comprise a structure that substantially encloses the PIG source. The particle accelerator may comprise magnetic yokes that define a cavity containing the acceleration region. The magnetic yokes may be for generating a magnetic field across the acceleration region. The magnetic field may be at least 2 Tesla (T). For example, the magnetic field may be at least 10.5 T. The voltage may comprise a radio frequency (RF) voltage that is less than 15 kV.

The particle accelerator may comprise one or more electrodes for use in accelerating the particles out of the particle accelerator. At least one cathode may be used in generating the plasma column. The at least one cathode used in generating the plasma column may comprise a cold cathode (e.g., one that is not heated by an external source). A capacitive circuit may couple at least some of the voltage to the cold cathode. The cold cathode may be configured to pulse voltage to generate the plasma column from gas in the first tube portion and the second tube portion.

Any of the foregoing features may be combined to form implementations not specifically described herein.

The details of one or more examples are set forth in the accompanying drawings and the description below. Further features, aspects, and advantages will become apparent from the description, the drawings, and the claims.

DETAILED DESCRIPTION

A synchrocyclotron-based system is described herein. However, the circuits and methods described herein may used with any type of cyclotron or particle accelerator.

Figure 1A:
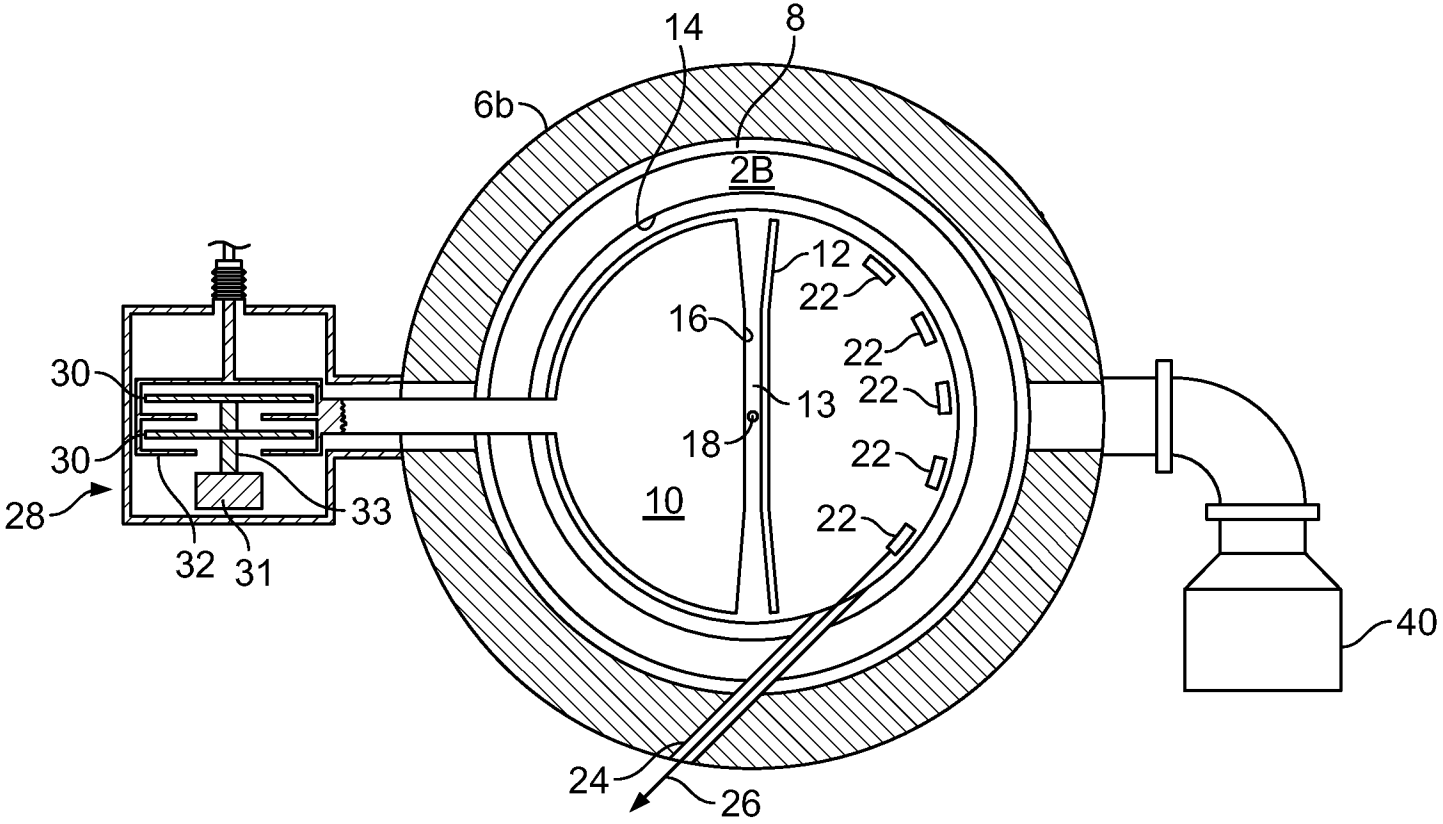
FIG. 1A is a cross-sectional view of a synchrocyclotron.
Figure 1B:
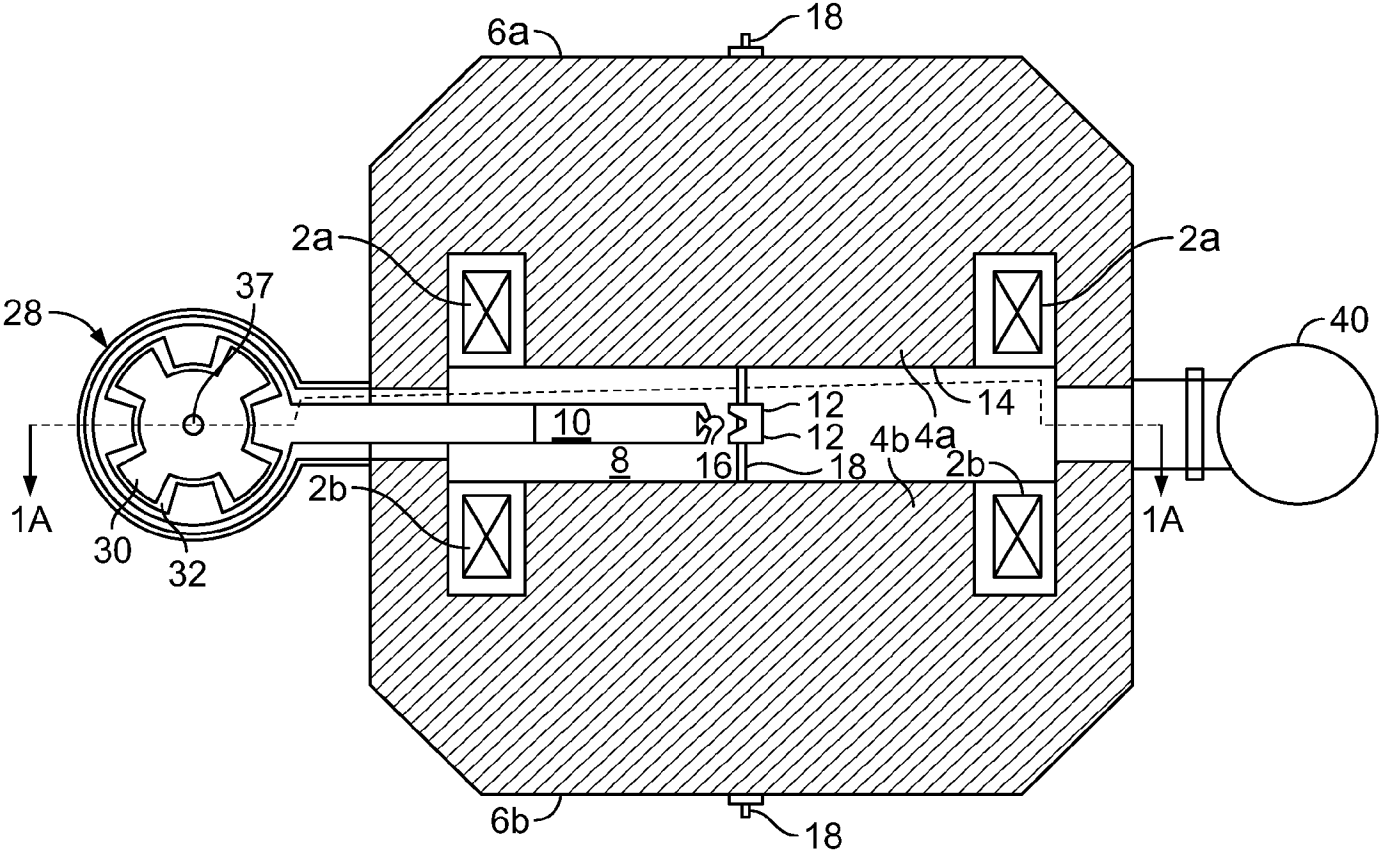
FIG. 1B is a side cross-sectional view of the synchrocyclotron shown in FIG. 1A.

Referring to FIGS. 1A and 1B, a synchrocyclotron 1 includes electrical coils 2a and 2b around two spaced apart ferro-magnetic poles 4a and 4b, which are configured to generate a magnetic field. Magnetic poles 4a and 4b are defined by two opposing portions of yokes 6a and 6b (shown in cross-section). The space between poles 4a and 4b defines vacuum chamber 8 or a separate vacuum chamber can be installed between poles 4a and 4b. The magnetic field strength is generally a function of distance from the center of vacuum chamber 8 and is determined largely by the choice of geometry of coils 2a and 2b and the shape and material of magnetic poles 4a and 4b.

The accelerating electrodes are defined as dee 10 and dee 12, having gap 13 between them. Dee 10 is connected to an alternating voltage potential whose frequency is changed from high to low during an accelerating cycle in order to account for the increasing relativistic mass of a charged particle and radially decreasing magnetic field (measured from the center of vacuum chamber 8) produced by coils 2a and 2b and pole portions 4a and 4b. Accordingly, dee 10 is referred to as the radio frequency (RF) dee. The idealized profile of the alternating voltage in dees 10 and 12 is show in FIG. 2 and will be discussed in detail below. In this example, RF dee 10 is a half-cylinder structure, which is hollow inside. Dee 12, also referred to as the "dummy dee", does not need to be a hollow cylindrical structure, since it is grounded at the vacuum chamber walls 14. Dee 12, as shown in FIGS. 1A and 1B, includes a strip of metal, e.g., copper, having a slot shaped to match a substantially similar slot in RF dee 10. Dee 12 can be shaped to form a mirror image of surface 16 of RF dee 10.

Ion source 18 is located at about the center of vacuum chamber 8, and is configured to provide particles (e.g., protons) at a center of the synchrocyclotron for acceleration, as described below. Extraction electrodes 22 direct the charged particles from an acceleration region into extraction channel 24, thereby forming beam 26 of the charged particles. Here, ion source 18 is inserted axially into the acceleration region.

Dees 10 and 12 and other pieces of hardware included in a synchrocyclotron define a tunable resonant circuit under an oscillating voltage input that creates an oscillating electric field across gap 13. The result is a resonant cavity in vacuum chamber 8. This resonant frequency of the resonant cavity can be tuned to keep its Q-factor high by synchronizing the frequency being swept. In one example, the resonant frequency of the resonant cavity moves, or "sweeps", within a range of about 30 Megahertz (MHz) and about 135 MHz (VHF range) over time, e.g., over about 1 millisecond (ms). In another example, the resonant frequency of the resonant cavity moves, or sweeps, between about 95 MHz and about 135 MHz in about 1 ms. Resonance of the cavity may be controlled in the manner described in U.S. patent application Ser. No. 11/948,359, entitled "Matching A Resonant Frequency Of A Resonant Cavity To A Frequency Of An Input Voltage", the contents of which are incorporated herein by reference as if set forth in full.

The Q-factor is a measure of the "quality" of a resonant system in its response to frequencies close to the resonant frequency. In this example, the Q-factor is defined as $$Q=1/R\times\sqrt{(L/C)},$$

where R is the active resistance of the resonant circuit, L is the inductance, and C is the capacitance of the resonant circuit.

The tuning mechanism can be, e.g., a variable inductance coil or a variable capacitance. A variable capacitance device can be a vibrating reed or a rotating capacitor. In the example shown in FIGS. 1A and 1B, the tuning mechanism includes rotating capacitor 28. Rotating capacitor 28 includes rotating blades 30 that are driven by a motor 31. During each cycle of motor 31, as blades 30 mesh with blades 32, the capacitance of the resonant circuit that includes dees 10 and 12 and rotating capacitor 28 increases and the resonant frequency decreases. The process reverses as the blades unmesh. Thus, the resonant frequency is changed by changing the capacitance of the resonant circuit. This serves the purpose of reducing, by a large factor, the power required to generate the high voltage applied at the dee/dummy dee gap at the frequency necessary to accelerate the particle beam. The shape of blades 30 and 32 can be machined so as to create the required dependence of resonant frequency on time.

The blade rotation can be synchronized with RF frequency generation so the frequency of the resonant circuit defined by the synchrocyclotron is kept close to the frequency of the alternating voltage potential applied to the resonant cavity. This promotes efficient transformation of applied RF power to RF voltage on the RF dee.

A vacuum pumping system 40 maintains vacuum chamber 8 at a very low pressure so as not to scatter the accelerating beam (or to provide relatively little scattering) and to substantially prevent electrical discharges from the RF dee.

To achieve substantially uniform acceleration in the synchrocyclotron, the frequency and the amplitude of the electric field across the dee gap is varied to account for the relativistic mass increase and radial variation of magnetic field as well as to maintain focus of the beam of particles. The radial variation of the magnetic field is measured as a distance from the center of an outwardly spiraling trajectory of a charged particle.

Figure 2:
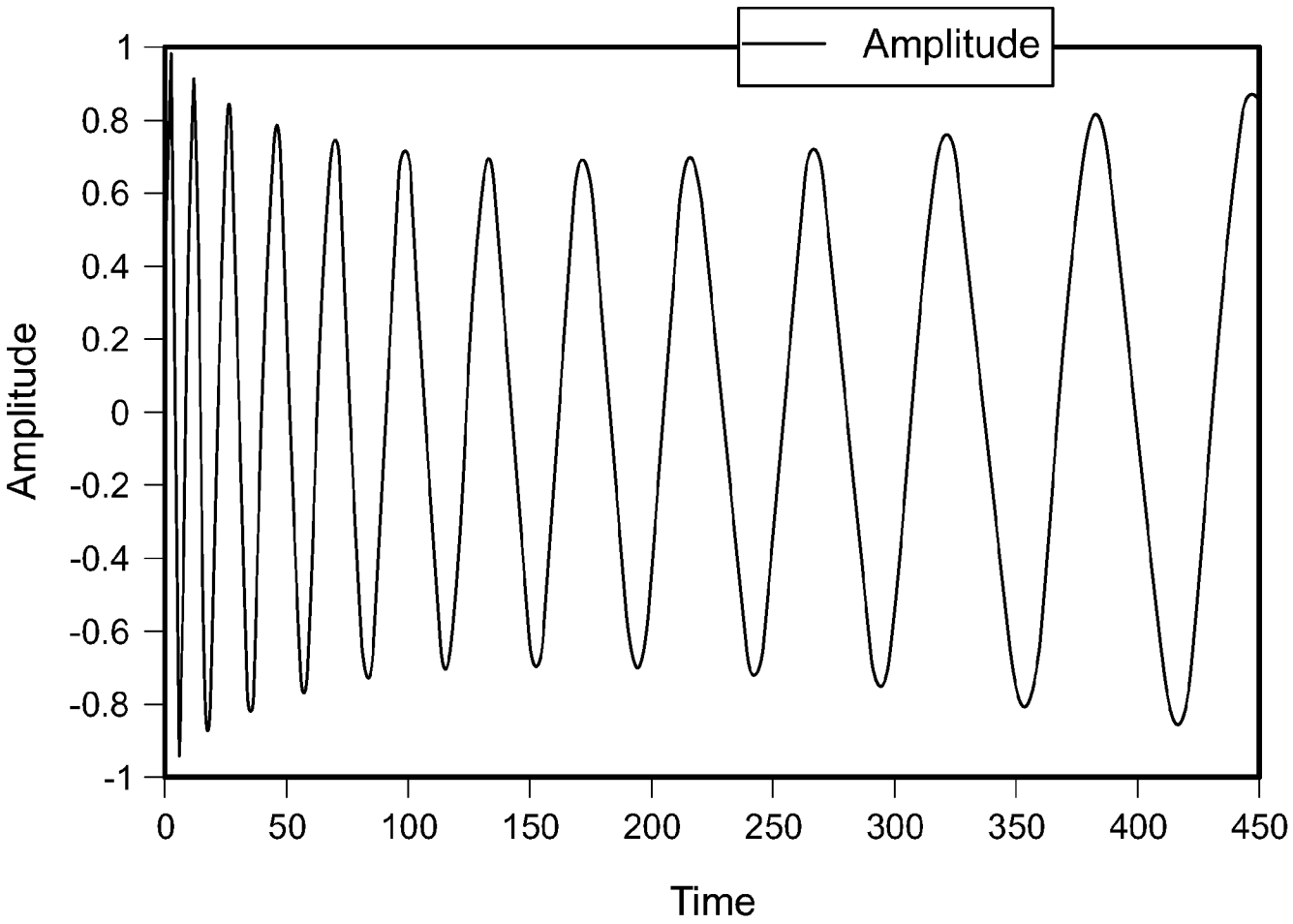
FIG. 2 is an illustration of an idealized waveform that can be used for accelerating charged particles in the synchrocyclotron of FIGS. 1A and 1B.

FIG. 2 is an illustration of an idealized waveform that may be required for accelerating charged particles in a synchrocyclotron. It shows only a few cycles of the waveform and does not necessarily represent the ideal frequency and amplitude modulation profiles. FIG. 2 illustrates the time varying amplitude and frequency properties of the waveform used in the synchrocyclotron. The frequency changes from high to low as the relativistic mass of the particle increases while the particle speed approaches a significant fraction of the speed of light.

Ion source 18 is deployed near to the magnetic center of synchrocyclotron 1 so that particles are present at the synchrocyclotron mid-plane, where they can be acted upon by the RF field (voltage). The ion source may have a Penning ion gauge (PIG) geometry. In the PIG geometry, two high voltage cathodes are placed about opposite each other. For example, one cathode may be on one side of the acceleration region and one cathode may be on the other side of the acceleration region and in line with the magnetic field lines. The dummy dee housings 12 of the source assembly may be at ground potential. The anode includes a tube extending toward the acceleration region. When a relatively small amount of a gas (e.g., hydrogen/$H_2$) occupies a region in the tube between the cathodes, a plasma column may be formed from the gas by applying a voltage to the cathodes. The applied voltage causes electrons to stream along the magnetic field lines, essentially parallel to the tube walls, and to ionize gas molecules that are concentrated inside the tube, thereby creating the plasma column.

Figure 3A:
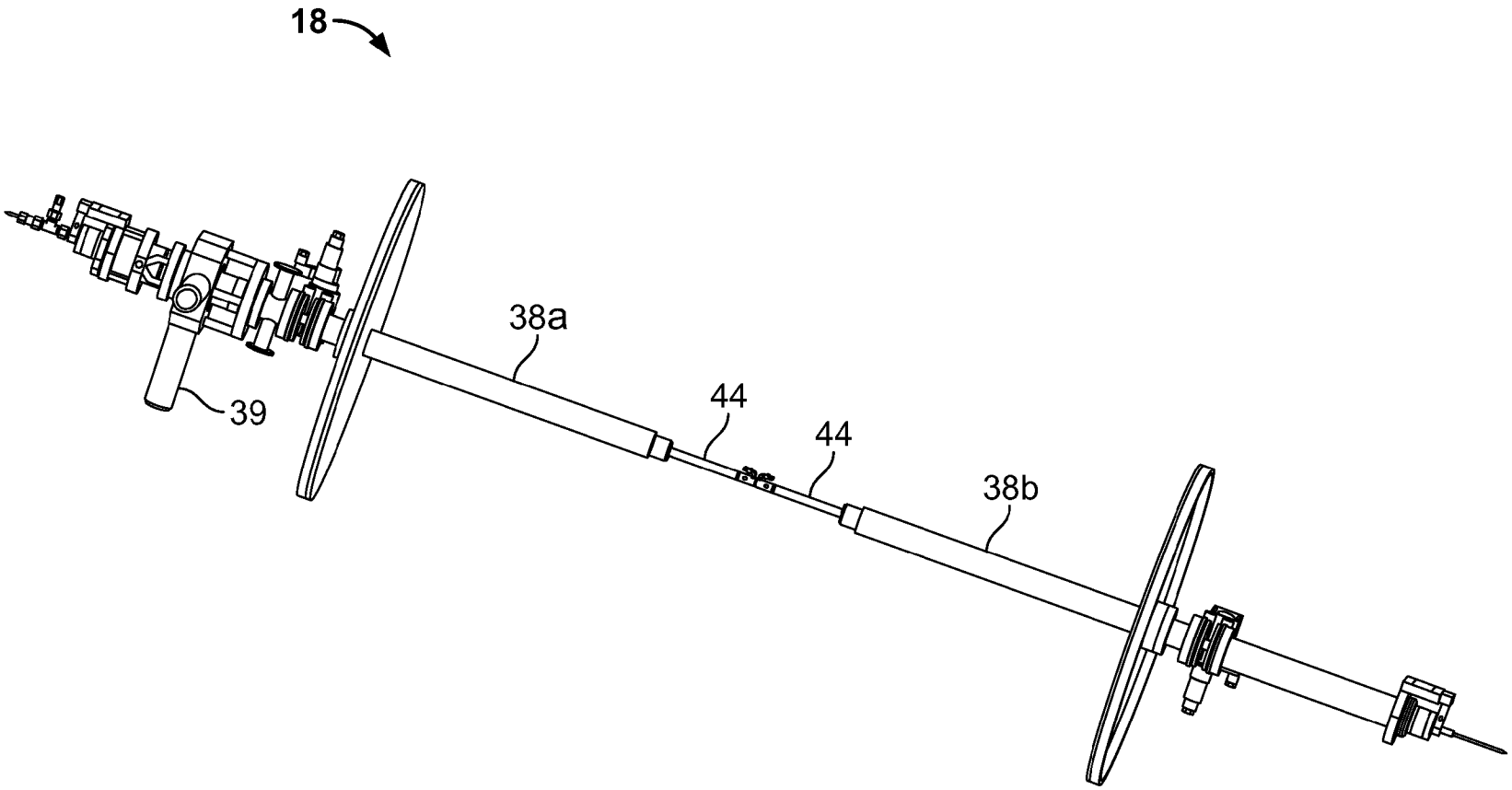
FIG. 3A is a side view of a particle source, such as a Penning ion gauge source.
Figure 3B:
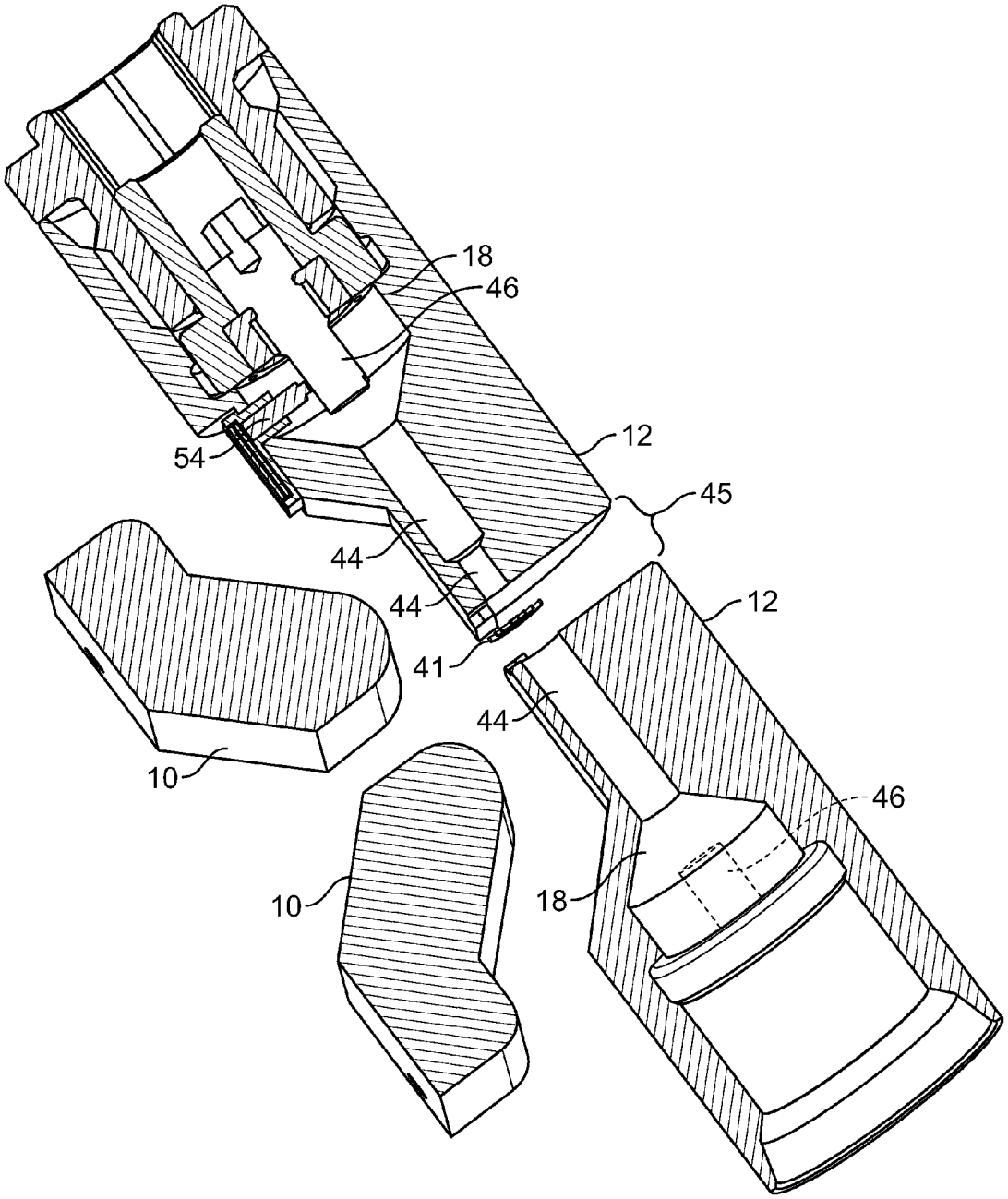
FIG. 3B is a close-up side view of a portion of the particle source of FIG. 3A passing through a dummy dee and adjacent to an RF dee.
Figure 4:
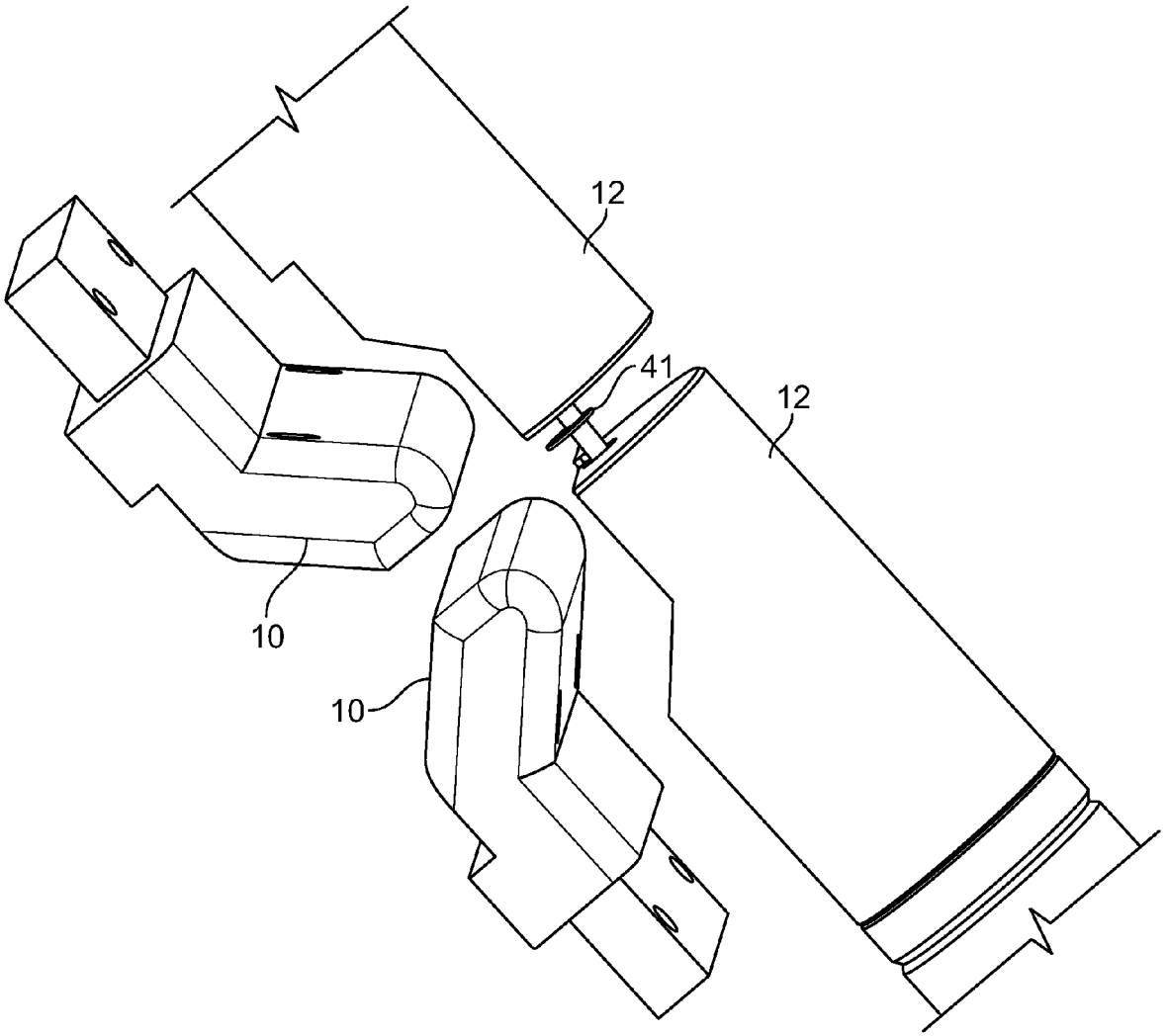
FIG. 4 is a side view of the particle source of FIG. 3 showing spiral acceleration of a particle from a plasma column generated by the particle source.
Figure 5:
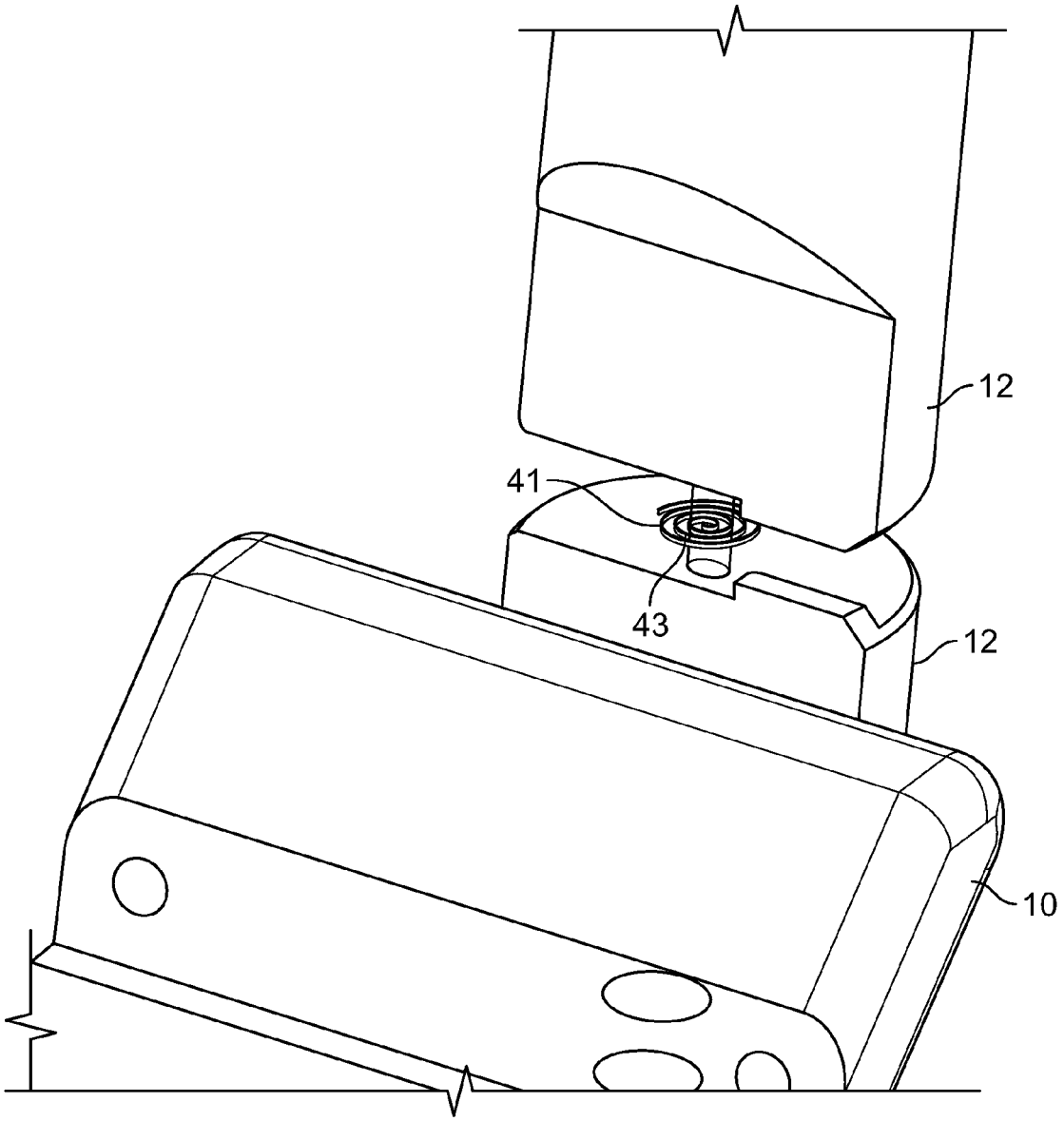
FIG. 5 is a perspective view of the particle source of FIG. 4
Figure 6:
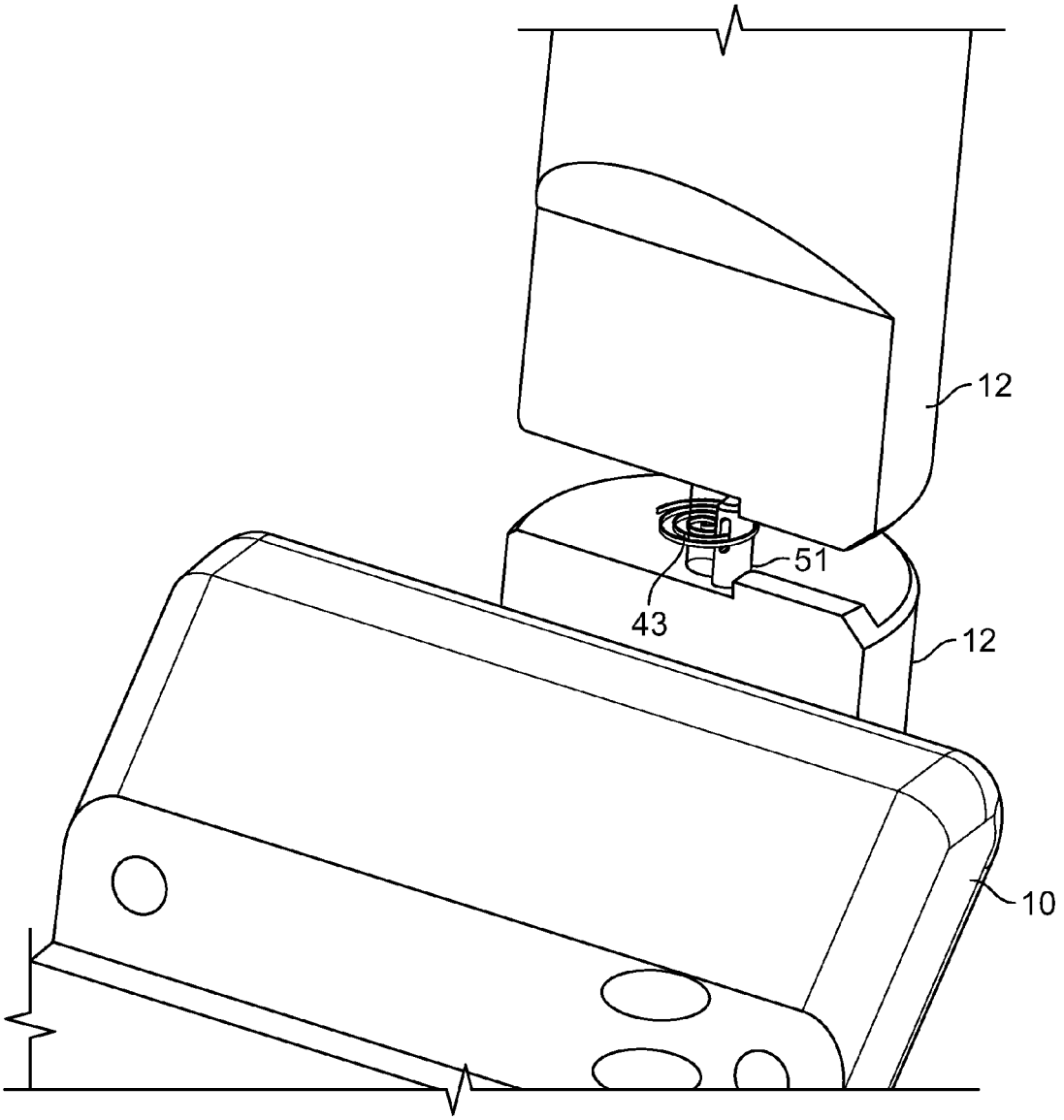
FIG. 6 is a perspective view of the particle source of FIG. 4 containing a stop for blocking one or more phases of particles.

A PIG geometry ion source 18, for use in synchrocyclotron 1, is shown in FIGS. 3A and 3B. Referring to FIG. 3A, ion source 18 includes an emitter side 38a containing a gas feed 39 for receiving gas, and a reflector side 38b. A housing, or tube, 44 holds the gas, as described below. FIG. 3B shows ion source 18 passing through dummy dee 12 and adjacent to RF dee 10. In operation, the magnetic field between RF dee 10 and dummy dee 12 causes particles (e.g., protons) to accelerate outwardly. The acceleration is spiral about the plasma column, with the particle-to-plasma-column radius progressively increasing. The spiral acceleration, labeled 43, is depicted in FIGS. 5 and 6. The radii of curvature of the spirals depend on a particle's mass, energy imparted to the particle by the RF field, and a strength of the magnetic field.

When the magnetic field is high, it can become difficult to impart enough energy to a particle so that it has a large enough radius of curvature to clear the physical housing of the ion source on its initial turn(s) during acceleration. The magnetic field is relatively high in the region of the ion source, e.g., on the order of 2 Tesla (T) or more (e.g., 8 T, 8.8 T, 8.9 T, 9 T, 10.5 T, or more). As a result of this relatively high magnetic field, the initial particle-to-ion-source radius is relatively small for low energy particles, where low energy particles include particles that are first drawn from the plasma column. For example, such a radius may be on the order of 1 mm. Because the radii are so small, at least initially, some particles may come into contact with the ion source's housing area, thereby preventing further outward acceleration of such particles. Accordingly, the housing of ion source 18 is interrupted, or separated to form two parts, as shown in FIG. 3B. That is, a portion of the ion source's housing is removed at the acceleration region 41, e.g., at about the point where the particles are to be drawn from the ion source. This interruption is labeled 45 in FIG. 3B. The housing may also be removed for distances above, and below, the acceleration region. All or part of dummy dee 12 at the acceleration region may, or may not, also be removed.

In the example of FIGS. 3A and 3B, the housing 44 includes a tube, which holds a plasma column containing particles to be accelerated. The tube may have different diameters at different points, as shown. The tube may reside within dummy dee 12, although this is not necessary. A portion of the tube in about a median plane of the synchrocyclotron is completely removed, resulting in a housing comprised of two separate portions with an interruption 45 between the portions. In this example, the interruption is about 1 millimeter (mm) to 3 mm (i.e., about 1 mm to 3 mm of the tube is removed). The amount of the tube that is removed may be significant enough to permit particle acceleration from the plasma column, but small enough to hinder significant dissipation of the plasma column in the interrupted portion.

By removing the physical structure, here the tube, at the particle acceleration region, particles can make initial turn(s) at relatively small radii—e.g., in the presence of relatively high magnetic fields—without coming in to contact with physical structures that impede further acceleration. The initial turn(s) may even cross back through the plasma column, depending upon the strength of the magnetic and RF fields.

The tube may have a relatively small interior diameter, e.g., about 2 mm. This leads to a plasma column that is also relatively narrow and, therefore, provides a relatively small set of original radial positions at which the particles can start accelerating. The tube is also sufficiently far from cathodes 46 used to produce the plasma column—in this example, about 10 mm from each cathode. These two features, combined, reduce the amount of hydrogen ($H_2$) gas flow into the synchrocyclotron to less than 1 standard cubic centimeter per minute (SCCM), thereby enabling the synchrocyclotron to operate with relatively small vacuum conductance apertures into the synchrocyclotron RF/beam cavity and relatively small capacity vacuum pump systems, e.g., about 500 liters-per-second.

Interruption of the tube also supports enhanced penetration of the RF field into the plasma column. That is, since there is no physical structure present at the interruption, the RF field can easily reach the plasma column. Furthermore, the interruption in the tube allows particles to be accelerated from the plasma column using different RF fields. For example, lower RF fields may be used to accelerate the particles. This can reduce the power requirements of systems used to generate the RF field. In one example, a 20 kilowatt (kW) RF system generates an RF field of 15 kilovolts (kV) to accelerate particles from the plasma column. The use of lower RF fields reduces RF system cooling requirements and RF voltage standoff requirements.

In the synchrocyclotron described herein, a particle beam is extracted using a resonant extraction system. That is, the amplitude of radial oscillations of the beam are increased by a magnetic perturbation inside the accelerator, which is in resonance with these oscillations. When a resonant extraction system is used, extraction efficiency is improved by limiting the phase space extent of the internal beam. With attention to the design of the magnetic and RF field generating structures, the phase space extent of the beam at extraction is determined by the phase space extent at the beginning of acceleration (e.g., at emergence from the ion source). As a result, relatively little beam may be lost at the entrance to the extraction channel and background radiation from the accelerator can be reduced.

A physical structure, or stop, may be provided to control the phase of the particles that are allowed to escape from the central region of the synchrocyclotron. An example of such a stop 51 is shown in FIG. 6. Stop 51 acts as a obstacle that blocks particles having certain phases. That is, particles that hit the stop are prevented from accelerating further, whereas particles that pass the stop continue their acceleration out of the synchrocyclotron. A stop may be near the plasma column, as shown in FIG. 6, in order to select phases during the initial turn(s) of particles where the particle energy is low, e.g., less than 50 kV. Alternatively, a stop may be located at any other point relative to the plasma column. In the example shown in FIG. 6, a single stop is located on the dummy dee 12. There, however, may be more than one stop (not shown) per dee.

Cathodes 46 may be "cold" cathodes. A cold cathode may be a cathode that is not heated by an external heat source. Also, the cathodes may be pulsed, meaning that they output signal burst(s) periodically rather than continuously. When the cathodes are cold, and are pulsed, the cathodes are less subject to wear and can therefore last relatively long. Furthermore, pulsing the cathodes can eliminate the need to watercool the cathodes. In one implementation, cathodes 46 pulse at a relatively high voltage, e.g., about 1 kV to about 4 kV, and moderate peak cathode discharge currents of about 50 mA to about 200 mA at a duty cycle between about 0.1% and about 1% or 2% at repetition rates between about 200 Hz to about 1 KHz.

Cold cathodes can sometimes cause timing jitter and ignition delay. That is, lack of sufficient heat in the cathodes can affect the time at which electrons are discharged in response to an applied voltage. For example, when the cathodes are not sufficiently heated, the discharge may occur several microseconds later, or longer, than expected. This can affect formation of the plasma column and, thus, operation of the particle accelerator. To counteract these effects, voltage from the RF field in cavity 8 may be coupled to the cathodes. Cathodes 46 are otherwise encased in a metal, which forms a Faraday shield to substantially shield the cathodes from the RF field. In one implementation, a portion of the RF energy may be coupled to the cathodes from the RF field, e.g., about 100V may be coupled to the cathodes from the RF field. FIG. 3B shows an implementation, in which a capacitive circuit 54, here a capacitor, is charged by the RF field and provides voltage to a cathode 46. An RF choke and DC feed may be used to charge the capacitor. A corresponding arrangement (not shown) may be implemented for the other cathode 46. The coupled RF voltage can reduce the timing jitter and reduce the discharge delay to about 100 nanoseconds (ns) or less in some implementations.

Figure 7:
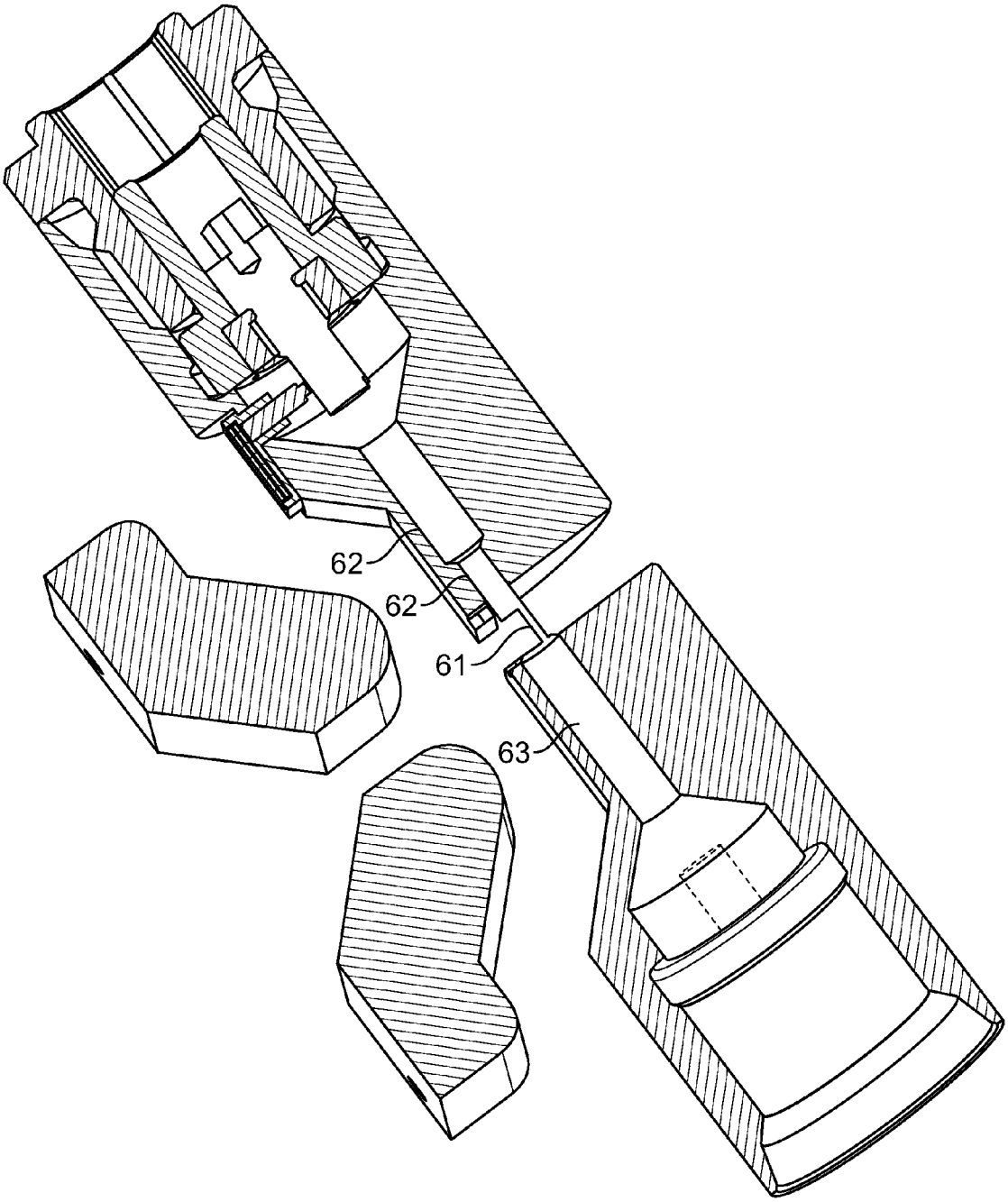
FIG. 7 is a perspective view of an alternative embodiment, in which a substantial portion of the ion source is removed.

An alternative embodiment is shown in FIG. 7. In this embodiment, a substantial portion, but not all, of the PIG source housing is removed, leaving the plasma beam partly exposed. Thus, portions of the PIG housing are separated from their counterpart portions, but there is not complete separation as was the case above. The portion 61 that remains physically connects the first tube portion 62 and the second tube portion 63 of the PIG source. In this embodiment, enough of the housing is removed to enable particles to perform at least one turn (orbit) without impinging on the portion 61 of the housing that remains. In one example, the first turn radius may be 1 mm, although other turn radii may be implemented. The embodiment shown in FIG. 7 may be combined with any of the other features described herein.

The particle source and accompanying features described herein are not limited to use with a synchrocyclotron, but rather may be used with any type of particle accelerator or cyclotron. Furthermore ion sources other than those having a PIG geometry may be used with any type of particle accelerator, and may have interrupted portions, cold cathodes, stops, and/or any of the other features described herein.

Components of different implementations described herein may be combined to form other embodiments not specifically set forth above. Other implementations not specifically described herein are also within the scope of the following claims.

What is claimed is:

1. A synchrocyclotron comprising:

magnetic structures to provide a magnetic field to a cavity;

a particle source [to provide] *comprising cathodes for generating* a plasma column [to] *in* the cavity, the particle source having a housing to hold the plasma column, the housing being interrupted at an acceleration region to expose the plasma column, wherein the housing is interrupted such that the housing is completely separated at the acceleration region [or such that a part of the housing is physically connected at the acceleration region]; and a voltage source to provide a radio frequency (RF) voltage to the cavity to accelerate particles from the plasma column at the acceleration region[;

wherein, in a case that part of the housing is physically connected, the part of the housing has structure that allows particles accelerated from the plasma column to perform at least one turn without impinging on the part of the housing].

2. The synchrocyclotron of claim 1, wherein the magnetic field is above 2 Tesla (T)[, and the particles move from the plasma column outwardly in spirals with radii that progressively increase].

3. The synchrocyclotron of claim 1, wherein the housing comprises two portions that are completely separated at the acceleration region to expose the plasma column.

4. The synchrocyclotron of claim 1, wherein the voltage source comprises a first dee that is electrically connected to an alternating voltage and a second dee that is electrically connected to ground; and wherein at least part of the particle source passes through the second dee.

5. The synchrocyclotron of claim 1, further comprising a stop in the acceleration region, the stop for blocking acceleration of at least some of the particles from the plasma column.

6. The synchrocyclotron of claim 5, wherein the stop is substantially orthogonal to the acceleration region and is configured to block certain phases of particles from the plasma column.

7. The synchrocyclotron of claim 1,[further comprising:

cathodes for use in generating the plasma column,] *wherein* the cathodes [being] *are* operable to pulse a voltage to ionize gas to generate the plasma column; *and* wherein the cathodes are not heated by an external heat source.

8. The synchrocyclotron of claim 7, wherein the cathodes are configured to pulse at voltages between about 1 kV to about 4 kV.

9. The synchrocyclotron of claim 7, further comprising:

a circuit to couple voltage from the RF voltage to the at least one of the cathodes.

10. The synchrocyclotron of claim 9, wherein the circuit comprises a capacitive circuit.

11. The synchrocyclotron of claim 1, wherein the magnetic structures comprise magnetic yokes, wherein the voltage source comprises a first dee that is electrically connected to an alternating voltage and a second dee that is electrically connected to ground, wherein the first dee and the second dee form a tunable resonant circuit, and wherein the cavity comprises a resonant cavity containing the tunable resonant circuit.

12. A synchrocyclotron comprising:

a tube containing a gas;

a first cathode adjacent to a first end of the tube; and a second cathode adjacent to a second end of the tube, the first and second cathodes applying voltage to the tube to form a plasma column from the gas;

wherein particles are available to be drawn from the plasma column for acceleration; and a circuit to couple energy from [an external] *a* radio frequency (RF) field to at least one of the cathodes;

wherein the tube is interrupted at an acceleration region where the particles are accelerated to expose the plasma column, wherein the tube is interrupted such that the tube is completely separated into two parts at the acceleration region [or such that a part of the tube is physically connected at the acceleration region where the particles are accelerated;

wherein, in a case that part of the tube is physically connected, the part of the tube has structure that allows particles accelerated from the plasma column to perform at least one turn without impinging on the part of the tube].

13. The synchrocyclotron of claim 12, wherein the first cathode and the second cathode are not heated by an external source.

14. The synchrocyclotron of claim 13, further comprising:

a voltage source to provide the RF field, the RF field for accelerating the particles from the plasma column at the acceleration region where the particles are accelerated.

15. The synchrocyclotron of claim 14, wherein the energy comprises a portion of the RF field provided by the voltage source.

16. The synchrocyclotron of claim 13, wherein the circuit comprises a capacitor to couple energy from the [external] RF field to at least one of the first cathode and the second cathode.

17. The synchrocyclotron of claim [13] *12*, wherein the tube comprises a first [portion] *part* and a second [portion that are completely separated at the acceleration region where the particles are accelerated] *part that are separated by a space that is between 1 mm and 3 mm*.

18. The synchrocyclotron of claim 13, further comprising:

a stop at the acceleration region, the stop to block at least one phase of the particles from further acceleration.

19. The synchrocyclotron of claim [13] *12*, further comprising:

a voltage source to provide the RF field to the plasma column, the RF field for accelerating the particles from the plasma column at the acceleration region where the particles are accelerated, wherein the RF field comprises voltage that is less than 15 kV; and magnetic [yokes] *structures* to provide a magnetic field that crosses the acceleration region where the particles are accelerated, the magnetic field being greater than about 2 Tesla (T).

20. The synchrocyclotron of claim 12, wherein the first cathode is on a different side of the acceleration region than the second cathode.

21. A synchrocyclotron comprising:

a Penning ion gauge (PIG) source comprising a first tube portion and a second tube portion, the first tube portion *having a first cathode* and the second tube portion *having a second cathode, the first cathode and the second cathode* for [holding] *generating* a plasma column that extends across an acceleration region from which particles are accelerated from the plasma column; and a voltage source to provide a voltage at the acceleration region, the voltage for accelerating particles out of the plasma column at the acceleration region;

wherein the first tube portion is completely separated from the second tube portion at the acceleration region [or a connection exists between the first tube portion and the second tube portion at the acceleration region;

wherein, in a case that the connection exists, the connection has structure that allows particles accelerated from the plasma column to perform at least one turn without impinging on the connection].

[22. The synchrocyclotron of claim 21, wherein the PIG source comprises a physical connection between a part of the first tube portion and the second tube portion, the physical connection enabling particles accelerating out of the plasma column to complete a first turn upon escaping from the plasma column without running into the physical connection.]

23. The synchrocyclotron of claim 21, wherein the PIG source passes through a first dee that is electrically connected to ground, and wherein a second dee that is electrically connected to an alternating voltage source provides the voltage at the acceleration region.

24. The synchrocyclotron of claim 21, further comprising:

magnetic [yokes] *structures* that [define] *border* a cavity containing the acceleration region, the magnetic [yokes] *structures* for generating a magnetic field across the acceleration region.

25. The synchrocyclotron of claim 24, wherein the magnetic field is at least 2 Tesla (T).

26. The synchrocyclotron of claim 25, wherein the magnetic field is at least 10.5 T.

27. The synchrocyclotron of claim [26] *21*, wherein the voltage comprises a radio frequency (RF) voltage that is less than 15 kV.

28. The synchrocyclotron of claim 21, further comprising one or more [electrodes for use in accelerating] *structures to direct* the particles out of the particle accelerator.

29. The synchrocyclotron of claim 21, [further comprising:

at least one cathode for use in generating the plasma column, the at least one cathode comprising] *wherein the first cathode comprises* a cold cathode *and the second cathode comprises a cold cathode*; and a capacitive circuit to couple at least some of the voltage to [the] at least one cathode.

30. The synchrocyclotron of claim 21, wherein the [at least one cathode is] *first cathode and the second cathode are* configured to pulse voltage to generate the plasma column from gas in the first tube portion and the second tube portion.

31. A particle accelerator comprising:

a tube containing a gas;

a first cathode adjacent to a first end of the tube;

a second cathode adjacent to a second end of the tube, the first and second cathodes applying voltage to the tube to form a plasma column from the gas;

wherein particles are available to be drawn from the plasma column for acceleration;

a circuit to couple energy from [an external] *a* radio frequency (RF) field to at least one of the cathodes; and magnetic structures to provide a magnetic field that crosses an acceleration region where the particles are accelerated, the magnetic field being greater than about 2 Tesla (T);

wherein the tube is interrupted at the acceleration region where the particles are accelerated to expose the plasma column, and wherein the tube is interrupted such that the tube is completely separated into two parts at the acceleration region [or such that a part of the tube is physically connected at the acceleration region where the particles are accelerated;

wherein, in a case that part of the tube is physically connected, the part of the tube has structure that allows particles accelerated from the plasma column to perform at least one turn without impinging on the part of the tube].

32. The particle accelerator of claim 31, wherein the first cathode and the second cathode are not heated by an external source.

33. The particle accelerator of claim 32, wherein the circuit comprises a capacitor to couple energy from the [external] RF field to at least one of the first cathode and the second cathode.

[34. The particle accelerator of claim 32, wherein the tube comprises a first portion and a second portion that are completely separated at the acceleration region where the particles are accelerated.]

35. The particle accelerator of claim [32] *31*, further comprising:

a stop at the acceleration region where the particles are accelerated, the stop to block at least one phase of the particles from further acceleration.

36. The particle accelerator of claim [32] *31*, further comprising:

a voltage source to provide the RF field to the plasma column, the RF field for accelerating the particles from the plasma column at the acceleration region where the particles are accelerated, wherein the RF field comprises voltage that is less than 15 kV; and

[where] *wherein* the magnetic structures comprise magnetic yokes.

37. The particle accelerator of claim 31, wherein the first cathode is on a different side of the acceleration region where the particles are accelerated than the second cathode.

38. The particle accelerator of claim 37, further comprising:

a voltage source to provide the RF field, the RF field for accelerating the particles from the plasma column at the acceleration region where the particles are accelerated.

39. The particle accelerator of claim 33, wherein the energy comprises a portion of the RF field [provided by the voltage source].

40. The particle accelerator of claim 31, wherein the magnetic field is greater than 8 T.

41. The particle accelerator of claim 31, wherein the magnetic field is greater than 10.5 T.

*42. A synchrocyclotron comprising:*

*ferromagnetic pole pieces that border a cavity containing an acceleration region;*

*electrical coils adjacent to the ferromagnetic pole pieces to produce a magnetic field of at least 2 Tesla (T) within the cavity; and*

*a Penning ion gauge (PIG) source comprised of a first part and a second part that are completely separated at the acceleration region to allow extraction of charged particles from a plasma column for acceleration, the first part having a first cathode and the second part*

*having a second cathode, the first cathode and the second cathode for generating the plasma column.*

*43. The synchrocyclotron of claim 42, wherein the magnetic field is at least 8 T.*

*44. The synchrocyclotron of claim 42, further comprising:*

*a voltage system to provide radio frequency (RF) voltage to the cavity, the voltage system comprising a first dee that is electrically connected to an alternating voltage and a second dee that is electrically connected to ground;*

*wherein at least part of the PIG source passes through the second dee.*

*45. A synchrocyclotron comprising:*

*ferromagnetic pole pieces that border a cavity containing an acceleration region;*

*electrical coils adjacent to the ferromagnetic pole pieces to produce a magnetic field of at least 2 Tesla (T) within the cavity;*

*a Penning ion gauge (PIG) source comprised of a first part and a second part that are completely separated at the acceleration region to allow extraction of charged particles from a plasma column for acceleration; and*

*a stop in the acceleration region, the stop for blocking at least some of the charged particles.*

*46. The synchrocyclotron of claim 45, wherein the stop is substantially orthogonal to the acceleration region and is configured to block certain phases of the charged particles.*

*47. The synchrocyclotron of claim 42, wherein the first cathode and the second cathode are operable to pulse a voltage to ionize gas to generate the plasma column; and*

*wherein the first and second cathodes are not heated by an external heat source.*

*48. The synchrocyclotron of claim 47, wherein the first and second cathodes are controllable to pulse at voltages between about 1 kV to about 4 kV.*

*49. The synchrocyclotron of claim 48, further comprising:*

*a circuit to couple voltage to at least one of the first and second cathodes.*

*50. The synchrocyclotron of claim 49, wherein the circuit comprises a capacitive circuit.*

*51. A synchrocyclotron comprising:*

*ferromagnetic pole pieces that border a cavity containing an acceleration region in which charged particles are accelerated, the cavity containing a magnetic field of at least 2 Tesla (T);*

*a particle source comprising a first part and a second part, the first part having a first cathode and the second part having a second cathode, the first part and the second part being completely separated at the acceleration region;*

*accelerating electrodes to provide a radio frequency (RF) voltage to the acceleration region to extract the charged particles, the RF voltage sweeping over a frequency range; and*

*circuitry to couple energy from the RF voltage to at least one of the first cathode or the second cathode.*

*52. The synchrocyclotron of claim 51, wherein the cavity contains a magnetic field that is at least 8 T.*

*53. The synchrocyclotron of claim 51, wherein the cavity contains a magnetic field that is at least 10.5 T.*

*54. The synchrocyclotron of claim 51, further comprising:*

*a voltage system to provide radio frequency (RF) voltage to the cavity, the voltage system comprising a first dee that is electrically connected to an alternating voltage and a second dee that is electrically connected to ground;*

*wherein at least part of the particle source passes through the second dee.*

*55. The synchrocyclotron of claim 51, further comprising a stop in the acceleration region, the stop for blocking at least some of the charged particles.*

*56. The synchrocyclotron of claim 55, wherein the stop is substantially orthogonal to the acceleration region and is configured to block certain phases of the charged particles.*

*57. The synchrocyclotron of claim 51, wherein the first and second cathodes are controllable to pulse at voltages between about 1 kV to about 4 kV.*

*58. The synchrocyclotron of claim 51, wherein the circuitry comprises a capacitive circuit.*

*59. A synchrocyclotron comprising:*

*ferromagnetic pole pieces that border a cavity containing an acceleration region;*

*a voltage system to provide radio frequency (RF) voltage to the cavity,*

*electrical coils around part of the ferromagnetic pole pieces to produce a magnetic field having a magnitude of at least 2 Tesla (T) within the cavity; and*

*a particle source that is completely separated at least at the acceleration region to allow extraction of charged particles from a plasma column for acceleration in response to the RF voltage, the particle source comprising a first part and a second part, the first part having a first cathode and the second part having a second cathode, the first and second cathodes for generating the plasma column.*

*60. The synchrocyclotron of claim 59, wherein the magnetic field is at least 8 T within the cavity.*

*61. The synchrocyclotron of claim 59, wherein the voltage system comprises a first dee that is electrically connected to an alternating voltage and a second dee that is electrically connected to ground; and*

*wherein the RF voltage provided to the cavity is less than 15 kV.*

*62. The synchrocyclotron of claim 59, wherein the first part and the second part are separated for distances above and below the acceleration region.*

*63. The synchrocyclotron of claim 59, wherein the plasma column is produced from a gas, and wherein flow of the gas into the synchrocyclotron is less than one standard cubic centimeter per minute (SCCM).*

*64. A synchrocyclotron comprising:*

*ferromagnetic pole pieces that border a cavity containing an acceleration region;*

*a voltage system to provide radio frequency (RF) voltage to the cavity,*

*electrical coils around part of the ferromagnetic pole pieces to produce a magnetic field having a magnitude of at least 2 Tesla (T) within the cavity;*

*a particle source that is interrupted at least at the acceleration region to allow extraction of charged particles from a plasma column for acceleration in response to the RF voltage; and*

*one or more stops at the acceleration region, the one or more stops to block at least one phase of the charged particles extracted from the particle source from further acceleration.*

* * * * *